(12) United States Patent
Poris et al.

(10) Patent No.: US 6,813,031 B1
(45) Date of Patent: *Nov. 2, 2004

(54) METHOD OF DETERMINING MATERIAL USING INTENSITY OF LIGHT

(75) Inventors: Jaime Poris, Los Gatos, CA (US); Claudio L. Rampoldi, Palo Alto, CA (US)

(73) Assignee: Nanometrics Incorporated, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/634,568

(22) Filed: Aug. 4, 2003

Related U.S. Application Data

(62) Division of application No. 09/724,813, filed on Nov. 28, 2000, now Pat. No. 6,633,389.

(51) Int. Cl.⁷ .............................................. G01B 9/02
(52) U.S. Cl. ...................................................... 356/516
(58) Field of Search ................................ 356/511, 513, 356/514, 516

(56) References Cited

U.S. PATENT DOCUMENTS

| | | | |
|---|---|---|---|
| 5,314,843 A | 5/1994 | Yu et al. | 437/225 |
| 5,348,002 A | 9/1994 | Caro | 128/633 |
| 5,555,471 A | 9/1996 | Xu et al. | 356/357 |
| 5,784,163 A | 7/1998 | Lu et al. | 356/351 |
| 5,872,629 A | 2/1999 | Colvard | 356/349 |
| 5,874,318 A | 2/1999 | Baker et al. | 438/8 |
| 5,914,782 A | 6/1999 | Sugiyama | 356/351 |
| 5,953,115 A | 9/1999 | Landers et al. | 356/237 |
| 5,983,167 A | 11/1999 | Ebisawa | 702/167 |
| 6,238,592 B1 | 5/2001 | Hardy et al. | 252/79.1 |
| 6,340,602 B1 | 1/2002 | Johnson et al. | 438/7 |
| 6,392,749 B1 | 5/2002 | Meeks et al. | 356/381 |
| 6,392,752 B1 | 5/2002 | Johnson | 356/511 |
| 6,633,389 B1 * | 10/2003 | Poris et al. | 356/513 |
| 6,657,216 B1 * | 12/2003 | Poris | 250/559.22 |

FOREIGN PATENT DOCUMENTS

| | | |
|---|---|---|
| EP | EL 0 831 295 A1 | 3/1998 |
| EP | 0 982 774 A2 | 3/2000 |
| WO | WO 00/54325 | 9/2000 |

OTHER PUBLICATIONS

Azzam, R. "Ellipsometery and Polarized Light" Elsevier Science B.V. (1977, 1987); pp. 282–287.

(List continued on next page.)

*Primary Examiner*—Samuel A. Turner
*Assistant Examiner*—Michael A. Lyons
(74) *Attorney, Agent, or Firm*—Silicon Valley Patent Group LLP

(57) ABSTRACT

A profiling method compensates for phase changes associated with the presence of multiple or varying material in the area to be measured. The profiling method measures at least a portion of the height profile of the area of interest. The phase of the different materials in the region are also obtained and used to generate a correction factor. Depending on the type of material in the region of interest, the correction factor may be the material specific phase difference of the materials in the region, e g., when at least one of the materials is opaque to the wavelength of light used to measure the height profile, or the relationship between the thickness and phase of the material for a desired thickness range, e.g., when one or more of the materials is transparent to the wavelengths used to measure the height profile. The correction factor is then used to correct and/or convert the measured phase profile to an actual height profile. Accordingly, an accurate height profile may be obtained for regions that include dishing, erosion, or that contain various types of materials.

4 Claims, 14 Drawing Sheets

OTHER PUBLICATIONS

Fujiwara, H et al., "Dept–profiles in compositionally–graded amorphous silicon alloy thin films analyzed by real time spectroscopic ellipsometry" *Elsevier Science S.A.* pp. 474–478.(1998).

Heavens, O.S. "Optical Properties of Thin Film Solids" *Dover Publications, Inc.* (1991), pp. 62–73.

Jennewin, H. et al., "Interferometrical Profilometry at Surfaces with Varying Materials" *SPIE* vol. 3677 1999), pp. 1009–1016.

Kildemo, M. et al.; "Measurement of the absorption edge of thick transparent substrates using the incoherent reflection model and spectroscopic UV—visible—near IR ellipsometry" *Elsevier Science S.A.* pp. 108–113 (1998).

Kim, Gee–Hong et al., "White light scanning interferometry for thickness measurement of thin film layers" *SPIE* vol. 3783 (1999), pp. 239–246.

Makosch, G., "LASSI—a scanning differential ac interferometer for surface profile and roughness measurement" *SPIE* vol. 1009, (1988); pp. 244–253.

Makosch, G. et al., "Surface profiling by electro–optical phase measurements" *SPIE* vol., 316 (1981), pp. 42–53.

"Numerical Recipes, The Art of Scientific Computing" by Press, Flannery, Teukolsky and Vetterling, published by Cambridge University Press 1988, 3.2 Rational Function Interpolation and Extrapolation, pp. 83–85 . . . (1988).

* cited by examiner

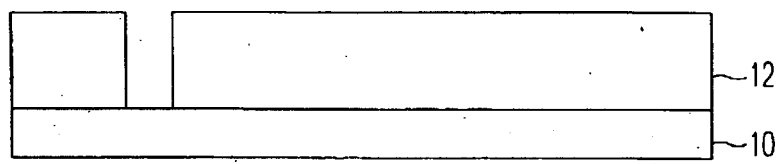
FIG. 1A
(Conventional)
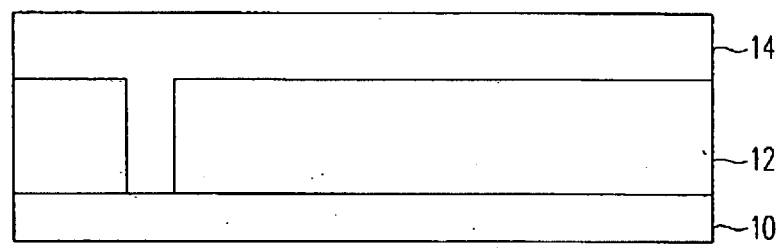
FIG. 1B
(Conventional)
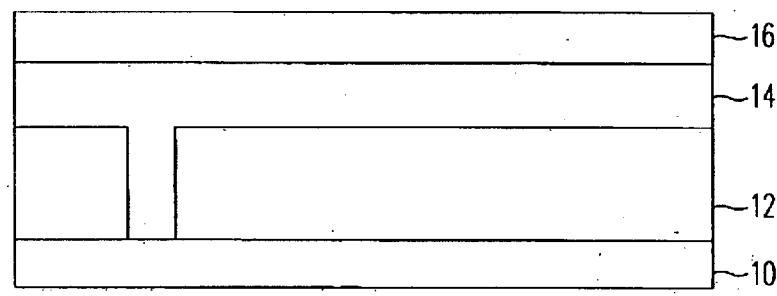
FIG. 1C
(Conventional)
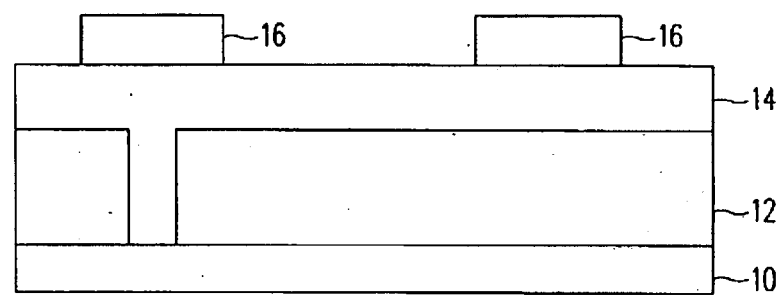
FIG. 1D
(Conventional)
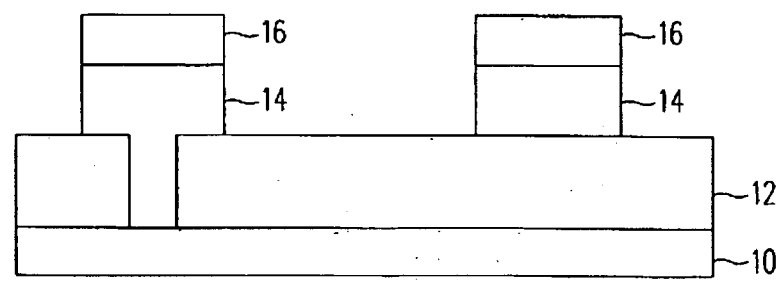
FIG. 1E
(Conventional)

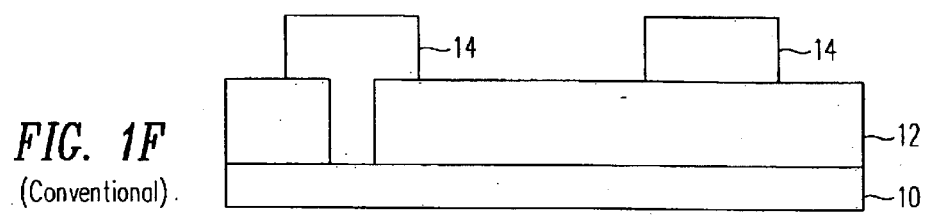
FIG. 1F
(Conventional)
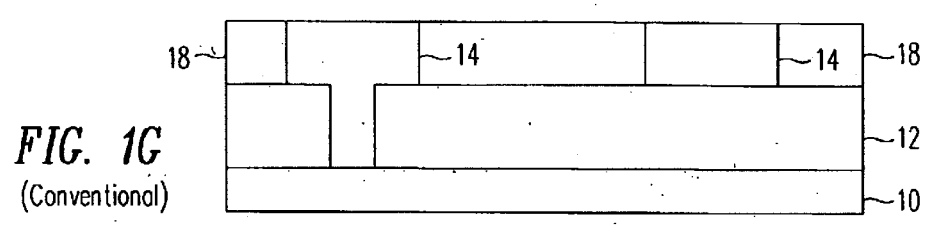
FIG. 1G
(Conventional)
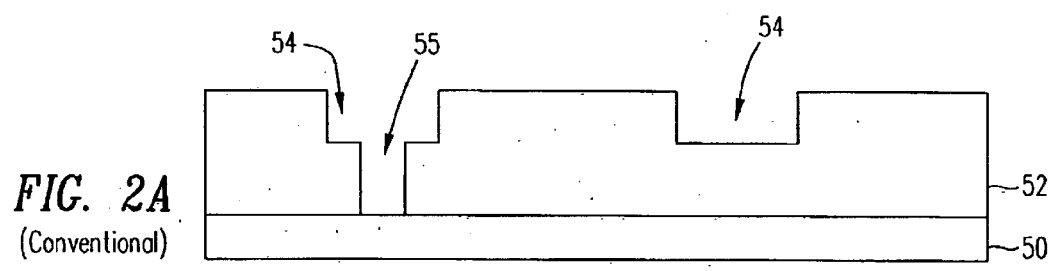
FIG. 2A
(Conventional)
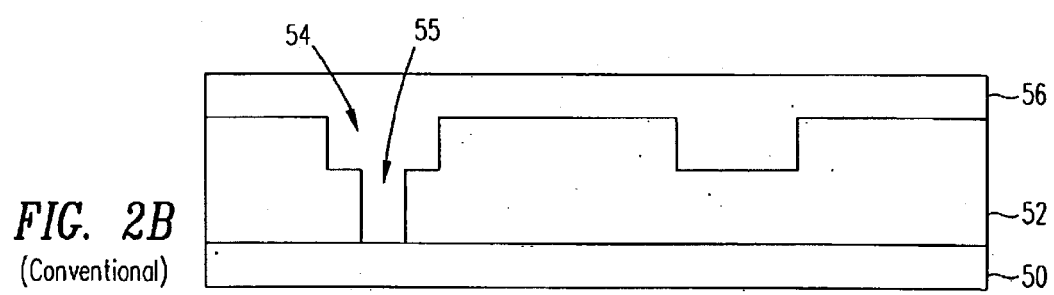
FIG. 2B
(Conventional)
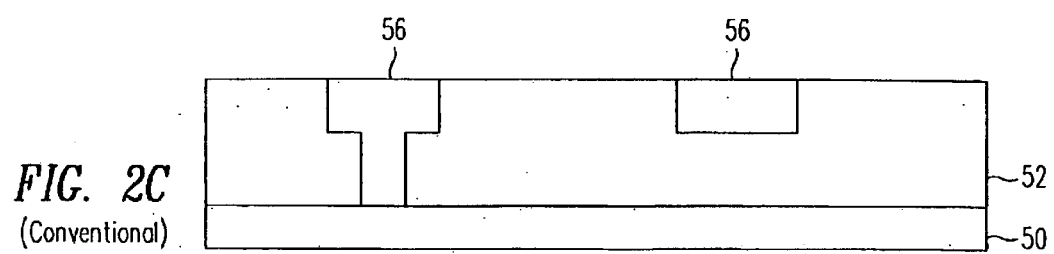
FIG. 2C
(Conventional)

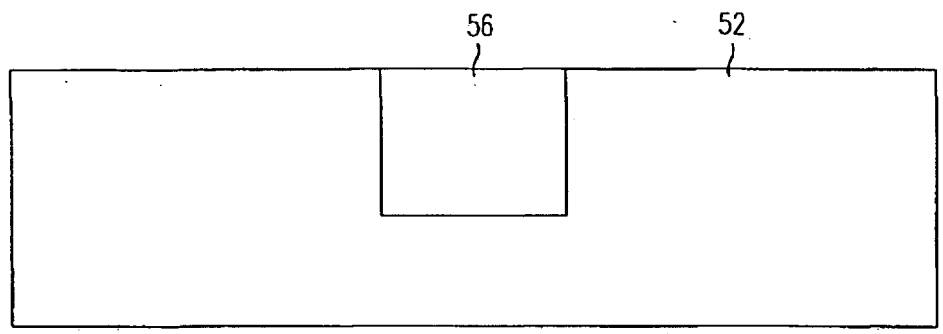
FIG. 3
(Conventional)
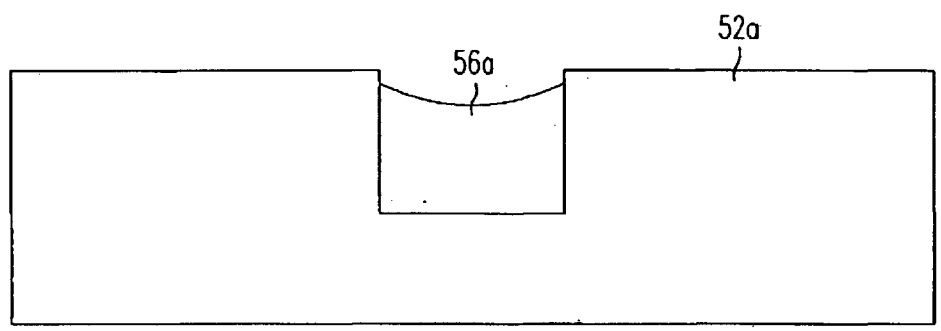
FIG. 4
(Conventional)

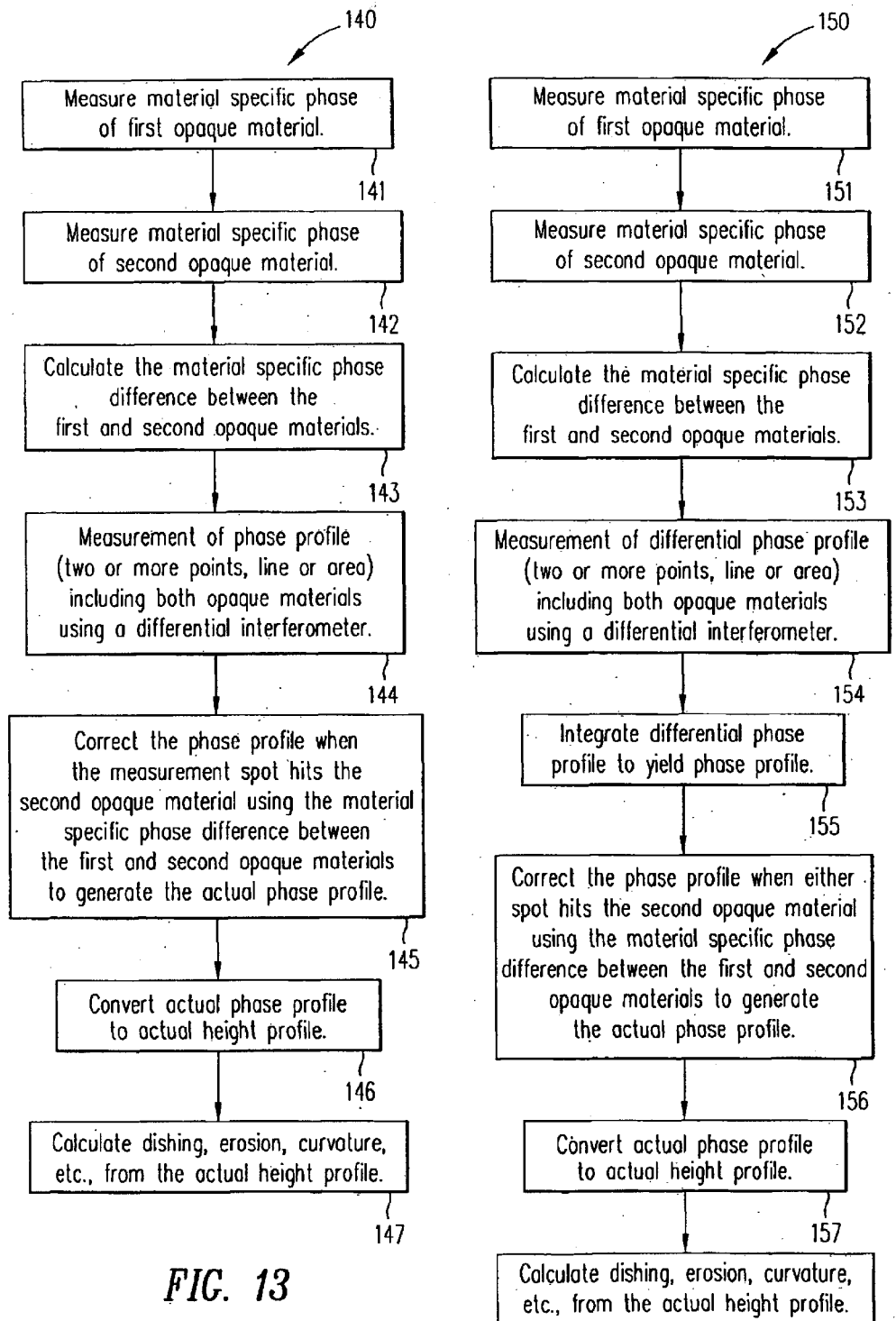

Key To

METHOD OF DETERMINING MATERIAL USING INTENSITY OF LIGHT

CROSS REFERENCE TO RELATED APPLICATION

This application is a divisional of U.S. patent application Ser. No. 09/71,813, filed Nov. 28, 2000 now U.S. Pat. No. 6,633,359, entitled "Profiling Method".

FIELD OF THE INVENTION

The present invention relates to measuring the surface profile properties of features. The proposed metrology method compensates for phase changes associated with the presence of multiple or varying materials on the surface of a substrate and in particular, to a metrology method to measure dishing, erosion, and/or an actual height profile of features on a sample.

BACKGROUND

The metal interconnect of integrated circuits has conventionally been realized by blanket depositing a layer of metal on a planar insulating surface. Portions of the metal layer are subsequently removed in a photolithographically patterned etching step to form the resulting metal conductors. Conventional integrated circuits have generally employed somewhat resistive metal, such as aluminum, or metal alloys for the metal interconnect. Copper has been chosen as a replacement metal for aluminum in smaller geometry devices. Due to complexities associated with etching copper, it must be patterned in a different manner. Copper is blanket deposited over the wafer that has trenches and vias etched into the dielectric and then it is subjected to chemical mechanical polishing (CMP) to remove the copper from the upper planar surface. The goal is to have a globally planar surface composed of copper and dielectric regions.

FIGS. 1A through 1G show a cut-away view of the conventional fabrication of an aluminum interconnect. As shown in FIG. 1A, a relatively planar surface layer 10, which may be, e.g., a silicon substrate, is covered with a dielectric layer 12, e.g., an oxide layer, which is patterned and etched. An aluminum layer 14, which may be an aluminum alloy, is blanket deposited over the dielectric layer 12, as shown in FIG. 1B. A photoresist layer 16 is deposited over the aluminum layer 14 (FIG. 1C), and is exposed and developed resulting in the structure shown in FIG. 1D. The aluminum layer 14 is then etched, e.g., using a plasma etching technique, resulting in the structure shown in FIG. 1E. The remaining photoresist layer 16 is removed resulting in the structure shown in FIG. 1F. After these steps are completed, the surface is composed of metal lines with near vertical sidewalls above the surface of the dielectric layer 12, as shown in FIG. 1F. Subsequently, dielectric layers are deposited and etched over the metal lines to yield a dielectric layer 18 with a planarized surface, e.g., for the next metal layer, as shown in FIG. 1G.

A major change is being implemented in semiconductor processing by switching from aluminum to copper metallization. Copper is preferred to aluminum due to its lower resistivity and better electromigration resistance. Unfortunately, copper is difficult to etch and the switch from aluminum to copper has forced a change in the basic metallization process. Copper cannot simply be substituted for aluminum in the metallization process because plasma etching of copper is more difficult than plasma etching of aluminum (due to the lack of volatile copper halogen compounds). Additionally, if copper is allowed to directly contact the dielectric materials, it can rapidly diffuse through dielectric materials and contaminate the semiconductor devices.

Thus, a "damascene" process has been developed whereby copper can be used as the interconnect metal. Rather than blanket depositing the interconnect metal on a substantially planar insulating substrate and then etching away parts of the metal layer to leave the conductors, trenches are formed in an insulating material. A composite layer of a diffusion barrier, nucleation layer and copper are then blanket deposited over the entire surface of the insulating substrate such that the trenches arc filled. Chemical mechanical polishing is then used to planarize the integrated circuit surface and thereby polish away all the metal that is not in the trenches. The result is metal conductors disposed in trenches and a globally planarized surface.

FIGS. 2A through 2C show a cut-away view of the conventional fabrication of a copper interconnect. As shown in FIG. 2A, a relatively planar surface layer 50, which may be, e.g., a silicon substrate, is covered with a dielectric layer 52, e.g., an oxide layer, which is patterned and etched. The dielectric layer 52 may be patterned and etched in multiple steps in order to produce trenches 54 and via 55. A diffusion barrier layer (not shown), nucleation layer (not shown), and copper layer 56 are blanket deposited over the dielectric layer 52 such that the trenches 54 and via 56 are filled, as shown in FIG. 2B. A chemical mechanical polishing step is then used to planarize the surface of the copper layer 56 (along with the diffusion barrier layer and nucleation layer) with dielectric layer 52, resulting in the structure shown in FIG. 2C.

The ideal copper CMP process removes the copper, nucleation layer and diffusion barrier from the surface of the dielectric while leaving behind the copper, nucleation layer and diffusion barrier in the trenches and contacts or vias. The ideal result would be a globally planarized surface with no vertical height change over the entire wafer surface. FIG. 3 shows the ideal resulting structure with a planar surface composed of a dielectric region 52 and idealized copper region 56. Global planarity is desirable because of the depth of field requirements associated with the lithographic steps. Significant height variations on the surface will compromise the photoresist processing steps and subsequently the etching and metallization processes. Height variations are also symptomatic of undesirable variations in the copper thickness and metal line resistance.

Unfortunately, because of the complexities associated with the CMP process, global planarity is not achievable. An artifact of the CMP processes in copper metallization results from the copper and dielectric material having different polishing rates, resulting in what is known as "dishing." FIG. 4 shows a cut-away side view of the typical resulting structure after the CMP process, in which the surface of the copper region 56a is lower than the surrounding dielectric region 52a. It should be understood that FIG. 4 is for exemplary purposes and is not to scale. Dishing may generally be defined as the maximum height difference between the metal region 56a and the adjacent dielectric region 52a after CMP processing.

Another artifact caused by the CMP process, as known to those of ordinary skill in the art, is "dielectric erosion," i.e., the dielectric regions exhibit a change in height over the surface of the wafer. This variation is related to the local density of metal features. Areas containing no metal features exhibit the highest dielectric surfaces, areas of low metal density exhibit relatively high dielectric surface regions and areas of high metal density result in relatively low dielectric surface regions.

The processing of silicon wafers to form integrated circuit chips requires many complex processing steps, for example, those described above. Each step must be carefully monitored and controlled to maximize the quality and yield of the final product. With the imminent replacement of aluminum by copper to form the metallization layers on silicon wafers, new processes and metrology techniques must be developed and implemented to characterize the degree of surface planarization after the CMP step.

Accordingly, what is needed is an economical, reliable, rapid, precise and accurate metrology procedure that can characterize and control individual steps during processing of a sample and specifically that will can be used to measure dishing, erosion, curvature, and/or the actual height profile of features on the sample.

SUMMARY

A profiling method, in accordance with the present invention, compensates for phase changes associated with the presence of multiple materials or materials, such as transparent or composite materials, having varying thickness in an area of a substrate to be measured. The phase profile of the area of interest is first measured, e.g., using a differential interferometer. If there is more than one material present, the constant material specific phase shift associated with an opaque material or the thickness dependent, material specific phase associated with a transparent or composite material at a single location are obtained. For each pair of materials hit by the reference and measurement spots, the difference in the phase values for the two materials is used to generate a phase correction factor for the appropriate fraction of the data. Next, the phase versus thickness relationship is generated for any transparent or composite materials over the thickness range of interest. The phase versus thickness relationship is used to convert the measured phase to actual thickness or height for the transparent or composite regions. The phase versus thickness relationship for an opaque material is constant, so no correction is required for opaque regions. When all of the data is appropriately corrected, the present invention advantageously generates an accurate thickness or height profile for regions on a sample that may include dishing, erosion or other surface features in the presence of more than one material or stack of transparent materials.

BRIEF DESCRIPTION OF THE DRAWINGS

FIGS. 1A through 1G show a cut-away view of the conventional fabrication of an aluminum interconnect.

FIGS. 2A through 2C show a cut-away view of the conventional fabrication of a copper interconnect.

FIG. 3 shows a cut-away view of the ideally planar metal and dielectric regions resulting from a planarization process.

FIG. 4 shows a cut-away view of the typical resulting structure after a CMP process showing dishing of the metal region.

FIG. 13 is a flow chart describing the process of generating the actual height profile of a sample composed of two opaque materials using a referential scan.

FIG. 14 is a flow chart describing the process of generating the actual height profile of a sample composed of two opaque materials using a differential scan.

DETAILED DESCRIPTION

Figure 5:
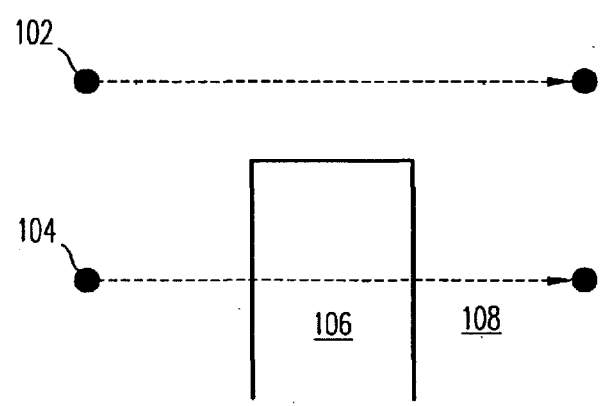
FIG. 5 shows a top view of the starting and ending locations of the reference and measurements spots associated with a referential scan of an opaque feature surrounded by transparent material.

A metrology process, in accordance with the present invention, directly measures the profile of a surface region of a substrate that may include one or more materials, e.g., two opaque materials, one opaque and one transparent material or two transparent materials. It should be understood that the terms opaque and transparent refer to the material being opaque or transparent to the wavelengths of light being used to measure the profile of the surface region. An opaque material may be, e.g., a metal, metal alloy, mixture of metals, extremely thick transparent material or mixture of extremely thick transparent materials. A signal will be present at the surface of the opaque material from a reflection from the top surface but not from a reflection from an underlying interface of the opaque material with another material. A transparent material may be a dielectric material or a composite material with a transparent component. A composite material with a transparent component may be made up of any combination of opaque and transparent materials or multiple transparent materials. The distribution of the two or more components in the composite material will typically have a characteristic dimension orthogonal to the measurement beam that is smaller than the spot size of the differential interferometer, otherwise the material would be treated as two discreet materials. The phase response from a composite material will thus be a function of the properties of the two or more materials and the geometry associated with the composite material. A signal will be present at the surface of the transparent or composite material from a reflection from the top surface as well as from one or more phase shifted reflections from one or more underlying interfaces.

The method corrects the measured phase profile using a phase correction factor and/or a method of converting phase to thickness for transparent or composite regions. The present invention may be used to generate height or thickness profiles of regions on semiconductor wafers, flat panel displays, or other similar flat substrates. The present metrology procedure, for example, can quantify dishing after a planarization process, e.g., a CMP process, in a fast, precise, accurate, reliable and economical manner.

In accordance with the present invention, the height profile of a region, e.g., the actual height difference between the opaque and adjacent transparent regions, is directly measured. Direct measurement of the surface height of opaque features, e.g., metal lines, and transparent features, e.g., dielectric regions, with a form of radiation is difficult because these two materials respond to radiation in a complex manner. Metal features are essentially opaque to most forms of radiation and produce a constant material specific phase shift, while the dielectric material is partially transparent to most forms of radiation that are used for measurement purposes and also modifies the phase response in a complex manner. Layers or features buried in the dielectric layer may also affect the reflected signal making the analysis of the dielectric surface more difficult. Thus, an understanding of the complex modifications of the phase shift of the different materials is necessary, and may be obtained using databases of known information and/or using detailed measurements, e.g., with an ellipsometer.

The presence of more than one material or one or more transparent or composite materials will introduce phase errors when the profiling tool uses radiation that interacts with the material. The present invention uses an optical tool, e.g., a differential interferometer, to measure the phase profile of a region and includes a method that compensates for these measured phase errors and can be used to correct the measured phase profile to produce an actual height or thickness profile. Consequently, an accurate measurement of dishing, erosion, curvature or any other desired height or thickness profile of interest may be obtained.

Figure 6:
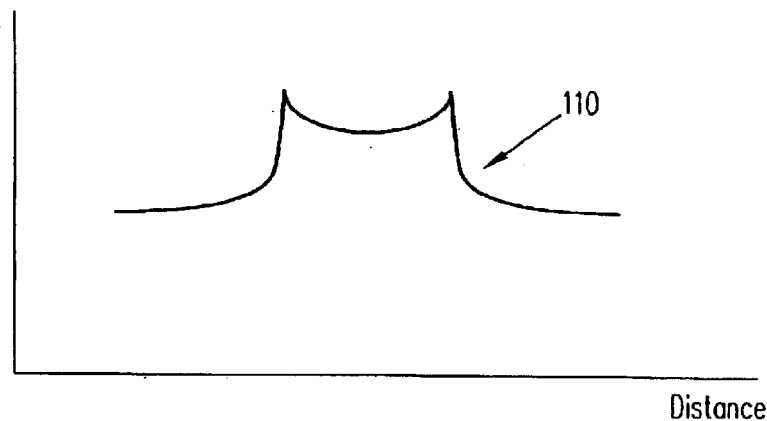
FIG. 6 shows a plot of the relative phase profile (lateral distance vs. relative phase) generated by the referential scan in FIG. 5.
Figure 7:
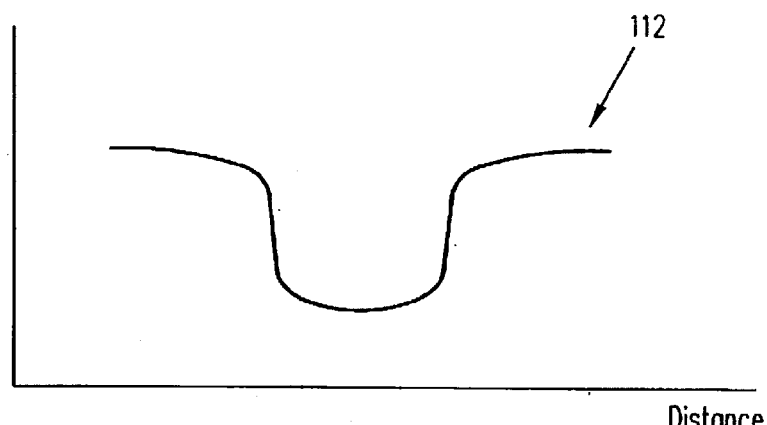
FIG. 7 shows a plot of the actual height profile (lateral distance vs. actual height) generated by the referential scan in FIG. 5 after correcting for phase errors.

As is well known in the art, a differential interferometer, creates two spots with orthogonal polarization states. The sample to be measured may be scanned by the differential interferometer in two different manners: in a reference mode and a differential mode. FIG. 5 illustrates the use of a differential interferometer in a reference mode, where one spot (the reference spot) 102 stays at two or more points, a line or an area of constant thickness or height. If desired, the reference spot 102 may stay at only one point, but that is practically difficult with conventional differential interferometers. The second spot (the measurement spot) 104 scans two or more points, a line or an area of the region of interest, which includes, e.g., feature 106 surrounded by area 108, which is composed of a different material compared to feature 106. FIG. 6 illustrates the resulting relative phase profile 110 versus scanning distance plot, which is related to the actual height profile 112, shown in FIG. 7, except for phase related errors. It is typically advantageous to have a relatively large spacing of the two spots 102 and 104 in the reference mode. The phase values are typically plotted relative to the first point of the scan because the phase values generated by the differential interferometer contain a constant offset related to properties associated with the optical path and are thus meaningless.

Figure 8:
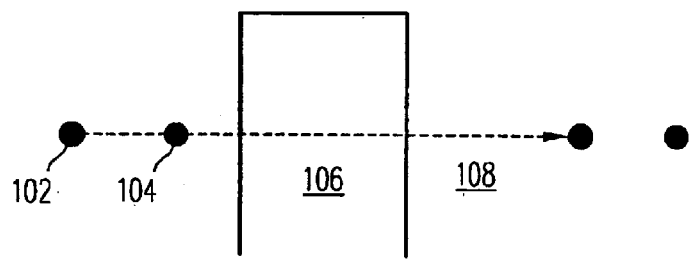
FIG. 8 shows a top view of the starting and ending locations of the reference and measurements spots associated with a differential scan of an opaque feature surrounded by transparent material.
Figure 9:
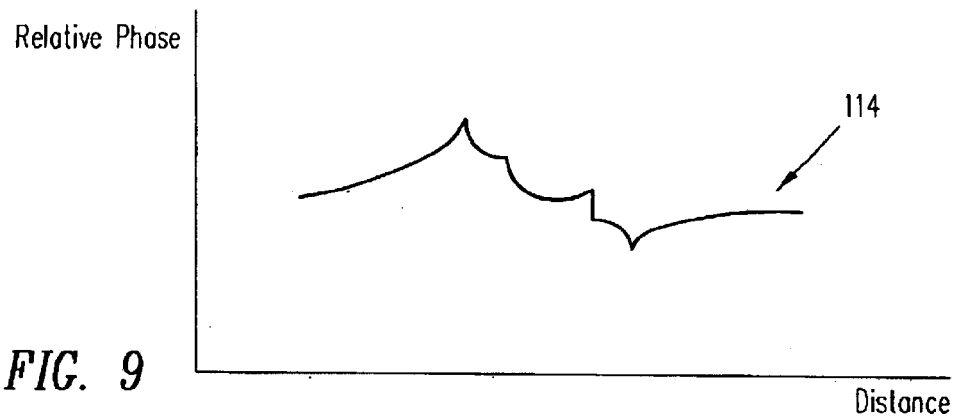
FIG. 9 shows a plot of the relative phase profile (lateral distance vs. relative phase) generated by the differential scan in FIG. 8.

FIG. 8 illustrates the use of a differential interferometer in differential mode, where the reference spot 102 and the measurement spot 104 follow the same path with, e.g., the measurement spot 104 being ahead of the reference spot 102. FIG. 9 illustrates the resulting plot 114, which is closely related to the derivative of the relative phase profile 110 in FIG. 6. If the resulting plot 114 is numerically integrated, the relative phase profile 110 in FIG. 6 is generated. The relative phase profile 110 of FIG. 6 may need to be corrected for phase errors to generate the actual height profile 112, shown in FIG. 7. The phase values are once again typically plotted relative to the first point of the scan. It is theoretically possible to generate the same relative phase profile from either a referential or differential scan if the differential scan is numerically integrated. Both methods may require phase corrections to produce the actual or thickness profile.

Figure 10:
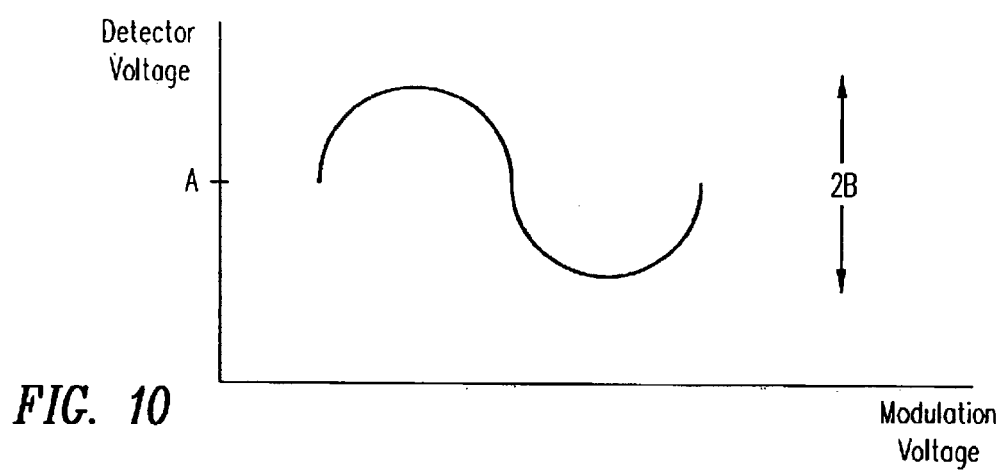
FIG. 10 shows the detector voltage signal as a function of the modulation voltage from a differential interferometer measurement.

When two or more materials are present during a differential interferometer scan, one must know the material being intercepted by each spot. This is required for the appropriate conversion of the measured phase profile to the corrected phase profile to the actual height profile. The signal from the laser is phase modulated, split into two beams, bounced off of the sample, recombined back into a single beam, made to interfere through a polarizer and measured by a detector. The resultant signal at the detector is in the form of a sine wave (FIG. 10). A phase or height measurement is associated with each sine wave. The hardware and principles involved are described in G. Makosch and B. Solf, "Surface Profiling by Electro-optical Phase Measurements", SPIE Vol. 316 High Resolution Soft X-Ray Optics, (1981), which is incorporated herein by reference. In this example of a single measurement point, the signal was modulated for slightly more than one full wavelength. The voltage intensity from the detector can be analyzed using the following equation:

$$\text{Intensity} = A + B \times Cos(CV + D) \qquad \text{eq. 1}$$

where A is the average intensity of the detector signal, B is one half of the peak to peak intensity, C is the modulator sensitivity, V is the applied modulator voltage and D is the phase shift associated with the two measurement spots. For each sinusoidal wave from the detector, A and B can be used to determine the intensity of each spot using the following formulas:

$$I1 = \frac{A + \sqrt{A^2 - B^2}}{2} \quad \text{eq. 2}$$

$$I2 = \frac{A - \sqrt{A^2 - B^2}}{2} \quad \text{eq. 3}$$

At any wavelength used by the differential interferometer, 11 and 12 will vary with the material being intercepted by each spot. The change in 11 and 12 as the scan progresses can be used to determine the specific materials being intercepted by each spot. For example, when copper and a dielectric material are present, the amplitude of the signal from the copper surface is approximately twice as large as the signal from the dielectric material. Prior knowledge of the amplitude associated with different materials is therefore required. The information relating amplitudes with different materials can be stored in a database to be used as needed. When a spot intercepts two materials, the amplitude will be determined by the area weighted average of the two materials. Typically, the phase response when two materials are intercepted is not analyzed. This is not of great consequence since it is typically a small fraction of the data.

In the rare case of two materials exhibiting similar intensities, additional information is required. For example, one might know that the higher portion of a step is associated with one material and the lower portion of the step is associated with another material. The analysis of the phase data would be based on this knowledge instead of calculating 11 and 12 from the measured data.

The present invention will be described with reference to five different regions that may be measured on the surface of a substrate. A composite material with a transparent component will be treated like a transparent material. The reference spot 102 and the measurement spot 104 may hit the surface of the sample in five different combinations of locations, including:
1) one opaque material at two locations;
2) two different opaque materials;
3) one opaque and one transparent material;
4) one transparent material at two locations;
5) two different transparent materials.

Moreover, each of the above combinations may be measured in a reference mode or a differential mode.

One Opaque Material at Two Locations

Figure 11:
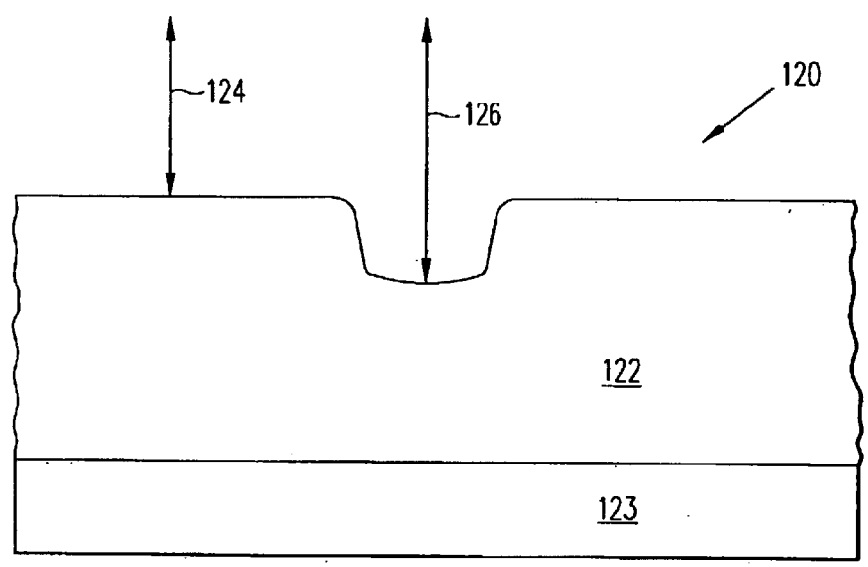
FIG. 11 shows a cut-away view of the height profile associated with a feature in a single opaque material.

FIG. 11 illustrates two beams orthogonal to the sample surface originating from an optical tool, e.g., a differential interferometer, measuring one opaque material 122 at two locations on a portion of sample 120. As shown in FIG. 11, opaque material 122 resides, e.g., directly on a substrate 123 or there may be materials between material 122 and substrate 123. As shown in FIG. 11, the optical tool is using a reference beam 124 and a measurement beam 126. FIG. 11 shows the differential interferometer operating in differential mode if the scan direction is parallel to the paper surface. Of course, the differential interferometer may operate in reference mode as well.

In this example, a referential scan is made. To simplify the analysis, the values in the measured phase profile ($\phi_m$) are referenced to the first measurement point of the scan. The phase value from the first measurement point ($\phi_0$) is subtracted from every phase value at location i ($\phi_i$). The measured phase profile is made up of two or more values based on the following equation:

$$\phi_m = \phi_i - \phi_0 \quad \text{eq. 4}$$

$\phi_i$ is the phase difference between the measurement spot and the reference spot at any measurement location i and $\phi_0$ is the phase difference between the measurement spot and the reference spot at the first point of the scan. At each location i, the initial phase measurement $\phi_0$ is subtracted from the phase measurement at location i to yield the measured phase value. According to this procedure, the first value of the measured phase profile is equal to zero.

Because the region of interest in FIG. 11 is composed of a single opaque material 122, such as a metal or metal alloy, no phase correction is required. The material specific phase shift associated with opaque material 122 is constant and thus can be ignored in this example. The measured phase profile can simply be converted to the actual height profile using the following formula:

$$H_c = \frac{\varphi_m \times \lambda}{4\pi} \quad \text{eq. 5}$$

where $H_C$ is the corrected height profile and $\lambda$ is the wavelength of light. By definition, $H_C$ equals zero at the first measurement spot. Thus, the phase profile generated by the differential interferometer can be directly converted to the actual height profile in reference mode, or can be numerically integrated and converted to yield the actual height profile in differential mode. This procedure is commonly employed using a differential interferometer.

Two Different Opaque Materials

Figure 12:
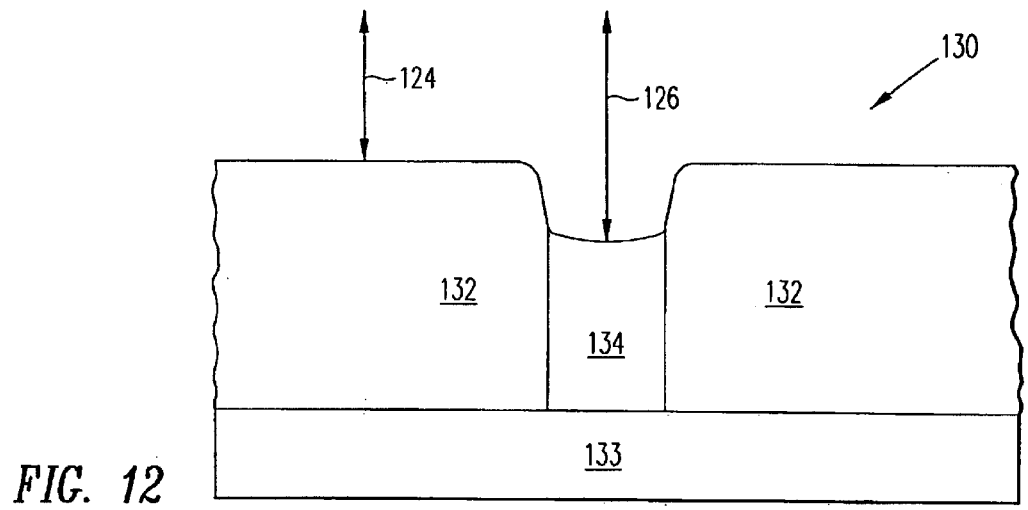
FIG. 12 shows a cut-away view of the height profile associated with a feature composed of one opaque material surrounded by a second opaque material.

FIG. 12 is similar to FIG. 11 but illustrates an optical tool, e.g., a differential interferometer, measuring two different opaque materials 132 and 134 on a portion of a sample 130. As shown in FIG. 12, opaque materials 132 and 134 reside, e.g., directly on a substrate 133 or there may be materials between substrate 133 and the opaque materials 132 and 134. FIG. 12 shows the point in the scan in which the reference beam 124 is incident on a first opaque material 132 while the measurement beam 126 is incident on a second opaque material 134. FIG. 12 shows the differential interferometer operating in differential mode if the scan direction is parallel to the paper surface. Of course, the differential interferometer may operate in reference mode as well. It should be understood that when the reference beam 124 and measurement beam 126 are incident on a single opaque material, e.g., both are incident on opaque material 132 or both are incident on opaque material 134, the corrected height profile would utilize the same procedure as described above in reference to FIG. 11.

FIG. 13 shows a flow chart 140 for generating the actual height profile of a reference scan of sample 130 with the measurement spot intercepting at least one point in both opaque materials 132 and 134 and the reference spot staying on opaque material 132 in FIG. 12. In step 141 a material specific phase measurement is made of the first opaque material 132. In step 142 a material specific phase measurement is made of the second opaque material 134. The phase measurements may be made using, e.g., an ellipsometer, and will provide a material specific phase for the material at one or more frequencies of radiation used by the differential interferometer. Alternatively, the phase measurements may be obtained from a reference source, e.g., a library of phase measurements of different materials. Values for n and k are obtained from the ellipsometer measurement or from a reference source and combined to yield the material specific phase at a given frequency as is understood in the art and is discussed in detail in H. Jennewein, H. Gottschling, T. Ganz and T. Tschudi, "Interferometrical Profilometry at Surfaces with Varying Materials", SPIE Conference on Metrology, Inspection and Process Control for Lithography XIII, Santa Clara, Calif., SPIE Vol. 3677, p. 1009–1016, March 1999, which is incorporated herein by reference. Actually measuring the material with, e.g., an ellipsometer, may provide a more accurate value of phase compared to a reference source as n and k will likely vary with impurity level and surface oxidation. Once the phase value for a material is obtained, either from a reference source or measured, the phase value may be placed in a database for future reference.

The material specific phase difference between the first opaque material 132 and second opaque material 134, i.e., the difference between the material specific phase values as measured or obtained from reference data, is determined as follows (step 143):

$$\Delta\phi_{O1,O2} = \phi_{O1} - \phi_{O2} \qquad \text{eq. 6}$$

where $\phi_{O1}$ is the material specific phase value of the first opaque material 132, $\phi_{O2}$ is the material specific phase value of second opaque material 134, and $\Delta\phi_{O1,O2}$ is the material specific phase difference for opaque materials 132 and 134.

A measurement is then made in reference mode with an optical tool, e.g., a differential interferometer that employs one or more wavelengths of light (step 144). In a typical scan, the measurement starts with both spots residing in opaque area 132, followed by the measurement spot traversing opaque material 134 followed by both spots residing in opaque material 132. As discussed above, in reference mode, the reference spot is incident on two or more points, a line or an area on material 132 that remain at a constant height and does not travel over opaque area 134.

Similar to the previous example, the phase profile is referenced to the first point of the scan. The measured phase profile is made up of two or more values based on the following equation:

$$\phi_m = \phi_i - \phi_0 \qquad \text{eq. 7}$$

At each location i, the initial phase measurement $\phi_0$ is subtracted from the phase measurement at location i to yield the measured phase value. The portions of the measured phase profile ($\phi_m$) when the measurement spot is incident on opaque material 132 do not need to be corrected, the actual phase profile ($\phi_c$) is equal to the measured phase profile:

$$\phi_c = \phi_m \qquad \text{eq. 8}$$

When the measurement spot is incident on opaque material 134 (and the reference spot is incident on opaque material 132), the phase profile is corrected using the material specific phase difference from equation 6 (step 145):

$$\phi_c = \phi_m - \Delta\phi_{O1,O2} \qquad \text{eq. 9}$$

The corrected portion of the measured phase profile when the measurement spot is incident on opaque material 134 along with the portions of the phase profile where the measurement spot was incident on opaque material 132 yield the corrected or actual phase profile of the entire scan. The actual phase profile can be converted to the actual height profile ($H_c$) using the following formula (step 146):

$$H_c = \frac{\varphi_c \times \lambda}{4\pi} \qquad \text{eq. 10}$$

A number of measurements may be extracted from the actual height profile to generate a measurement such as dishing, erosion, curvature, or other desired measurements (step 147).

If a region can be found on the sample where there is no step height difference between the two opaque materials, a direct measurement of the material specific phase difference between the two materials can be made, for example, using a differential interferometer, thereby replacing steps 141 and 142. First a measurement must be made with both spots hitting the same opaque material at the same height. Then a measurement is made with one spot on each opaque material at the same height. The difference between these two measurements yields the material specific phase difference between the two materials (step 143). Alternatively, if a region can be found on the sample where there is a known step height difference between the two opaque materials, a measurement of the phase difference between the two materials can be made as above, e.g., using a differential interferometer, after subtracting the contribution of the known step height.

FIG. 14 shows a flow chart 150 for generating the actual height profile of sample 130 using a differential scan with the measurement spot intercepting at least one point in each opaque material 132 and 134 shown in FIG. 12. The method of generating the actual height profile using a differential scan is similar to the method of using a reference scan as described in FIG. 13. As shown in FIG. 14, in step 151 a material specific phase measurement is made of the first opaque material 132. In step 152 a material specific phase measurement is made of the second opaque material 134.

The material specific phase difference between the first opaque material 132 and second opaque material 134, i.e., the difference between the material specific phase values as measured or obtained from reference data, is determined (step 153) as follows:

$$\Delta\phi_{O1,O2} = \phi_{O1} - \phi_{O2} \qquad \text{eq. 11}$$

where $\phi_{O1}$ is the material specific phase value of the first opaque material 132, $\phi_{O2}$ is the material specific phase value of second opaque material 134, and $\Delta\phi_{O1,O2}$ is the material specific phase difference for opaque materials 132 and 134. A similar parameter $\Delta\phi_{O2,O1}$ must also be calculated for use when the materials that the spots intercept are reversed. The parameter $\Delta\phi_{O2,O1}$ is simply the negative of $\Delta\phi_{O1,O2}$.

A measurement is then made in differential mode with an optical tool, e.g., a differential interferometer that employs one or more wavelengths of light (step 154). In a typical scan, the measurement starts with both spots residing in opaque area 132, followed by the measurement spot traversing opaque material 134 while the reference spot is still in opaque material 132, followed by both spots residing in opaque material 134, followed by the measurement spot traversing opaque material 132 while the reference spot is still in opaque material 134 and finally followed by both spots residing in opaque material 132. This scenario assumes that the spacing of the two spots is smaller than the dimension of the feature made of opaque material 134. If the spacing of the two spots is larger than the dimension of the feature made of opaque material 134, both spots would never simultaneously reside in the feature made of opaque material 134. Although with a small enough pitch and a large spot spacing, the spots could both reside in two different features made up of opaque material 134.

With a differential mode scan, the phase profile must be numerically integrated to yield the phase profile that would be generated by a referential scan (step 155).

The portions of the measured phase profile ($\phi_m$) when both spots are incident on opaque material 132 do not need to be corrected, the corrected or actual phase profile ($\phi_c$) is equal to the measured phase profile:

$$\phi_c = \phi_m \qquad \text{eq. 12}$$

When either spot is incident on opaque material 134, the phase profile ($\phi_m$) is corrected using one of two material specific phase differences depending on the materials intercepted by the two spots (step 156):

$$\phi_c = \phi_m - \Delta\phi_{O1,O2} \qquad \text{eq. 13}$$

$$\phi_c = \phi_m - \Delta\phi_{O2,O1} \qquad \text{eq. 14}$$

The corrected portion of the measured phase profile when either spot is incident on opaque material 134 along with the portions of the phase profile where both measurement spots are incident on opaque material 132 yield the corrected or actual phase profile of the entire scan.

The actual-phase profile can be converted to the actual height profile using the following formula (step 157):

$$H_c = \frac{\varphi_c \times \lambda}{4\pi} \qquad \text{eq. 15}$$

A number of measurements may be extracted from the actual height profile to generate a measurement such as dishing, erosion, curvature, or other desired measurements (step 158).

If a region can be found on the sample where there is no step height difference between the two opaque materials, a direct measurement of the material specific phase difference between the two materials can be made, for example, using a differential interferometer, thereby replacing steps 151 and 152. The difference between these two measurements yields the material specific phase difference between the two materials (step 153). Alternatively, if a region can be found on the sample where there is a known step height difference between the two opaque materials, a measurement of the phase difference between the two materials can be made as above, e.g., using a differential interferometer, after subtracting the contribution of the known step height.

One Opaque Material and One Transparent Material

The process of depositing copper into trenches and vias formed on a dielectric substrate followed by polishing of the-copper may result in dishing and erosion as discussed in reference to FIGS. 2A, 2B, 2C, 3 and 4. The resulting dished and eroded regions may be accurately measured in accordance with the present embodiment.

Figure 15:
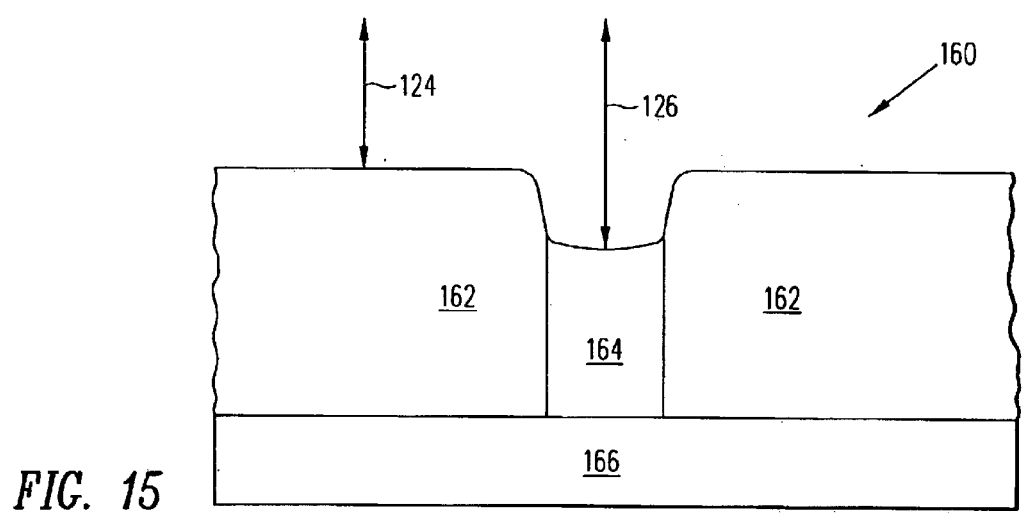
FIG. 15 shows a cut-away view of the height profile associated with a feature composed of an opaque material surrounded by transparent material.

FIG. 15 is similar to FIG. 12 but illustrates an optical tool, e.g., a differential interferometer, measuring the height profile of an opaque material 164 and a transparent material 162 on a portion of a sample 160. The transparent material 162 resides on opaque or extremely thick substrate 166. The reference beam 124 is incident on the transparent material 162, which may be a dielectric layer or stack, e.g., an oxide/nitride/oxide stack, while the measurement beam 126 is incident on the opaque material 164, which may be, e.g., copper, aluminum or tungsten or alloys thereof.

Again, while FIG. 15 shows the differential interferometer operating in differential mode if the scan direction is parallel to the paper surface, it should be understood that the differential interferometer may operate in referential mode with the reference beam 124 being incident on an opaque material, similar to material 164 or on transparent material 162. The starting location must be in an area of constant height or thickness for a differential mode measurement or two or more reference points, a line or an area must be at the same height or thickness for a referential mode measurement. Moreover, it should be understood that when the reference beam 124 and measurement beam 126 are both incident on the same opaque material, e.g., both are incident on opaque material 164, the measurement of the height profile is the same as described above in reference to FIG. 11.

Figure 16:
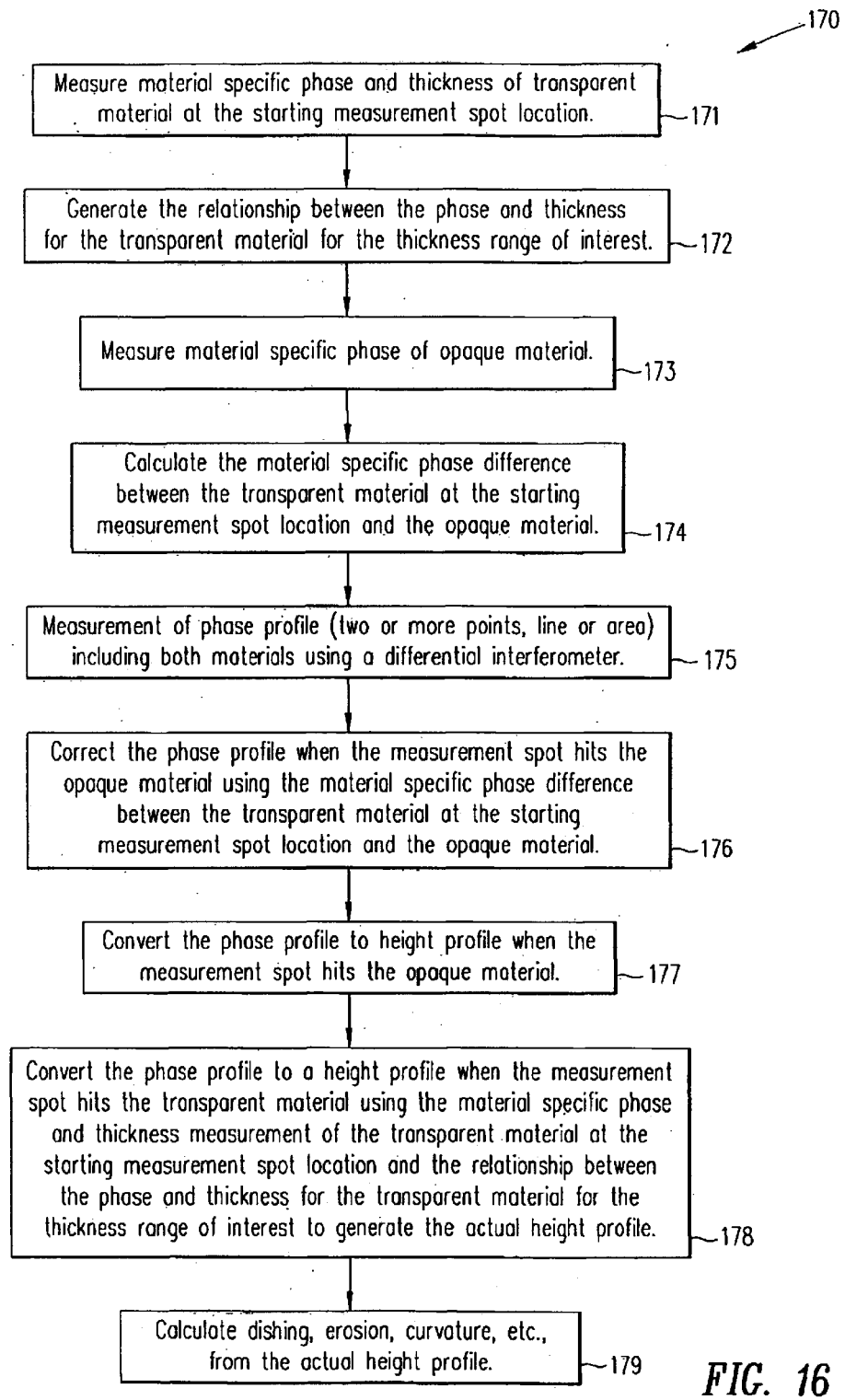
FIG. 16 is a flow chart describing the process of generating the actual height profile of a sample composed of an opaque material and a transparent material using a referential scan.

FIG. 16 shows a flow chart 170 for generating the actual height profile of a reference scan of sample 160 with the measurement spot intercepting at least one point in opaque material 164 and one point in transparent material 162 and the reference spot staying in transparent material 162 in FIG. 15. In step 171 a material specific phase and thickness measurement is made of transparent material 162 preferably at the starting location of the measurement sport using, e.g., a reflectometer or ellipsometer. The thickness measurement of transparent material 162 at this location will provide the absolute thickness of the actual thickness profile and may be necessary if material 162 has more than two or three thickness values for a particular phase value. This measurement is experimentally determined because of the variation of phase with thickness. All reference points, a reference line or a reference area must be at the same thickness for a precise reference mode measurement.

Figure 18:
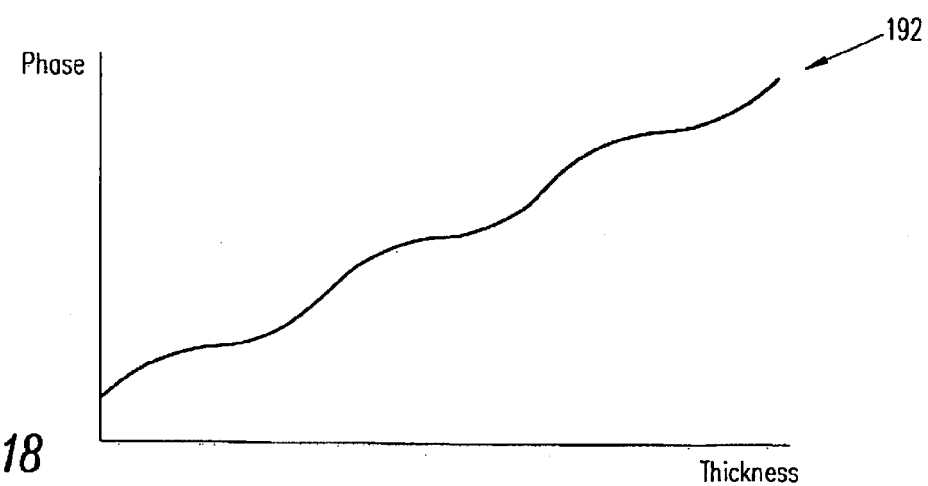
FIG. 18 shows the plot of the relationship of the absolute phase and the thickness for the transparent region from FIG. 15.

The relationship between the thickness and phase of the transparent material 162 is generated for the thickness range of interest (step 172). A simplification is to assume that only the top layer of a multi-layer dielectric stack is changing in thickness over the distance of the scan. Local erosion of the dielectric stack from the CMP process allows this assumption to be made. For example, if the measured thickness of transparent material 162 is 1.0 $\mu$m, the relationship between the thickness and phase would be generated from 0.7 $\mu$m to 1.1 $\mu$m with the change in thickness resulting from the uppermost layer of transparent material 162. FIG. 18 shows a plot 192 of the variation of the phase of the entire transparent material or stack 162 over a thickness range with only the top layer varying in thickness. As can be seen, the phase of the transparent material is not linear as the thickness increases. Thus, a mathematical model must be made to generate the relationship between thickness and phase of the transparent material or stack 162. This relationship is a complex function of the thicknesses, indices of refraction and extinction coefficients of the dielectric stack materials and is generated by adding the contributions of the waves reflected and transmitted at each interface by using a generalized form of the Fresnel equations. Because the relationship between the thickness and phase is not always monotonic, it may be necessary to measure the thickness of the transparent material 162 at the starting location in step 171, for example, in the situation where there are two or three thickness values for a particular phase value.

The phase versus thickness relationship can be extracted from the generalized complex reflection coefficients $r_s$ and $r_p$. These coefficients for s- and p-polarizations of a film stack are given by a recursion procedure to the following two formulas for each film in the dielectric stack:

$$r_s = \frac{r_{sj,j} + 1 + r_{sj,j} - 1\exp(-i2\beta_j)}{1 + r_{sj,j} + 1 r_{sj,j} - 1\exp(-i2\beta_j)} \qquad \text{eq. 16a}$$

$$r_p = \frac{r_{pj,j} + 1 + r_{pj,j} - 1\exp(-i2\beta_j)}{1 + r_{pj,j} + 1 r_{pj,j} - 1\exp(-i2\beta_j)} \qquad \text{eq. 16b}$$

where the following two equations correspond to the standard Fresnel coefficients at the interface between layer i and j:

$$r_{si,j} = \frac{n_i\cos\theta_i - n_j\cos\theta_j}{n_i\cos\theta_i + n_j\cos\theta_j} \qquad \text{eq. 17a}$$

-continued $$r_{pij} = \frac{n_i\cos\theta_j - n_j\cos\theta_i}{n_i\cos\theta_j + n_j\cos\theta_i} \quad \text{eq. 17a}$$

and $\beta_j$ is the phase shift caused by film j upon reflection and is defined as:

$$\beta_j = \frac{2\pi n_j \cos\theta_i t_j}{\lambda} \quad \text{eq. 18}$$

where $n_j$ is the refractive index of film j, $\theta_j$ is the angle of incidence of the measurement beam, $t_j$ is the thickness of film j and $\lambda$ is the wavelength of light. Equations 16a, 16b, 17a, 17b and 18 are from R. M. A. Azzam and N. M. Bashara, "Ellipsometry and Polarized Light", Elsevier, Amsterdam, 1999, which is incorporated herein by reference. The mathematical procedure to generate the relationship between thickness and phase is also described in Gee Hong Kim and Seung Woo Kim, "White light scanning interferometry for thickness measurement of thin film layers", SPIE Conference on Optical Diagnostics for Fluids/Heat/Combustion and Photomechanics for Solids, Denver Colo., SPIE Vol. 3783, p. 239, July 1999; and O. S. Heavens, "Optical properties of thin solid films", Dover Publications Inc., Mineola, N.Y., 1991, which are incorporated herein by reference.

When a composite material with a transparent component is involved, a similar procedure is employed to generate the phase versus thickness relationship. However, the generation of the phase versus thickness relationship for a composite material has a somewhat greater complexity than for a simple transparent material due to the additional material components and the variables related to the specific geometry associated with the composite material. Due to the nature of the composite material, a model must be developed to predict the variation of phase with thickness when a constant phase opaque material is illuminated along with a transparent material. The opaque feature density and the pitch will affect the output of the model and typically results in a relationship similar to that of a phase versus thickness relationship for a simple transparent material but exhibits a smaller average slope due to the constant phase behavior of the opaque material. A simple model of the phase versus thickness relationship for a composite region, by way of example, might weight the varying phase of the transparent material and the constant phase of the opaque material by the metal density while ignoring the pitch. In step 173, a material specific phase measurement is made of opaque material 164. The phase measurements may be made using, e.g., an ellipsometer, and will provide a material specific phase for the material at one or more frequencies used by the differential interferometer. Alternatively, the phase measurements may be obtained from a reference source, e.g., a library of phase measurements of different materials, as discussed above.

The material specific phase difference between the transparent material 162 and the opaque material 164, is calculated (step 174) as follows:

$$\Delta\phi_{T,O} = \phi_T - \phi_O \quad \text{eq. 19}$$

where $\phi_T$ is the material specific phase value of the transparent material 162 at the starting measurement location of the scan, $\phi_O$ is the material specific phase value of opaque material 164, and $\Delta\phi_{T,O}$ is the material specific phase difference between the transparent material 162 and the opaque material 164.

A measurement is then made in reference mode with an optical tool, i.e., a differential interferometer that employs one or more wavelengths of light (step 175). In a typical scan, the measurement starts with both spots residing in transparent material 162, followed by the measurement spot traversing opaque material 164 followed by both spots residing in transparent material 162. In the reference mode, the reference spot is preferably incident on two or more points, a line or an area of transparent material 162 that remains at a constant thickness and does not travel over opaque material 164.

When the measurement spot is incident on opaque material 164, the phase profile is corrected using the material specific phase difference from equation 19 (step 176):

$$\phi_c = \phi_m - \phi_{T,O} \quad \text{eq. 20}$$

When the measurement spot is incident on opaque material 164, the phase profile is converted to a height profile using the following equation (step 177):

$$H_c = \frac{\varphi_c \times \lambda}{4\pi} \quad \text{eq. 21}$$

Figure 19:
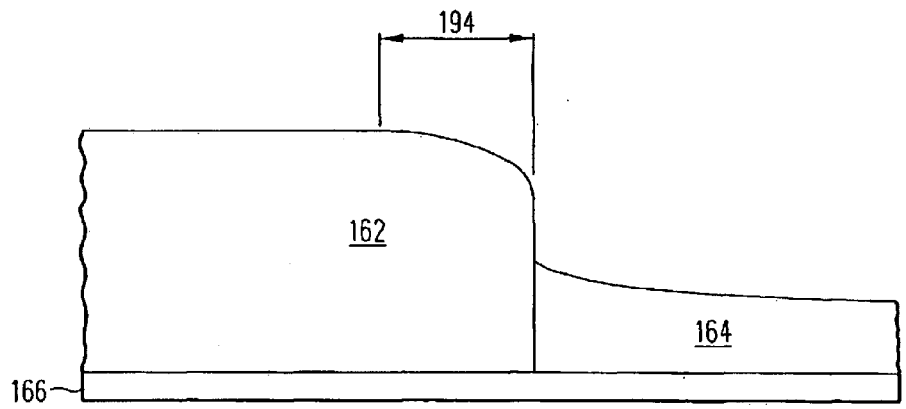
FIG. 19 shows a cut-away view of the thickness profile associated with the transparent material immediately adjacent to the opaque feature in FIG. 15.

The material specific phase (and thickness if necessary) of transparent material 162 and the relationship between the thickness and phase of transparent material 162 from step 172 are used, advantageously, to convert the phase profile to a height profile when both the reference beam 124 and the measurement beam 126 are incident on transparent material 162 (step 178). This is particularly useful to measure erosion of the transparent material that is near the opaque material. FIG. 19 shows the particular area of interest 194 of sample 160 where the transparent material or stack 162 residing over the substrate 166 erodes near the opaque material 164.

The material specific phase reflectometer or ellipsometer measurement from step 171 is located on the plot from step 172 (FIG. 18). The thickness of the transparent material at this location can be read from this plot. If the relationship between thickness and phase for the transparent material is such that there are two or three thickness values for a particular phase value, the thickness measurement from step 171 must be used to identify the correct thickness in FIG. 18. The phase value from step 171 is then subtracted from all of the following interferometer phase measurements. The converted measurements now represent the difference in phase of each measurement point with respect to the first interferometer point that is coincident with the reflectometer or ellipsometer measurement location. By definition, the difference in phase value is zero for the first measurement point. For all of the other points, the difference in phase measurement can now be located on the y axis with respect to the first measurement phase value and the thickness can be read off of the x axis of FIG. 18. Once all of the phase measurement points are converted to thickness, the actual height profile of the transparent region can be generated.

A number of measurements may be extracted from the actual height profile to generate a measurement such as dishing, erosion, curvature, or other desired measurements (step 179).

If a region can be found on the sample where there is no step height difference between the transparent material and the opaque material, a direct measurement of the material specific phase difference between the two materials can be made thereby replacing step 173. First the phase difference between the transparent and opaque materials with no step is measured, e.g., using a differential interferometer. Next, the phase difference between the transparent material at this location and the transparent material at the starting measurement location is measured, e.g., using a differential interferometer. The material specific phase difference is calculated from these two measurements (step 174). The measured height profile can then be corrected (step 176) using this phase difference, rather than the standard calculated phase difference. Alternatively, if a region can be found on the sample with a known step height between the transparent material and the opaque material, a measurement of the phase difference between the two materials can be made, e.g., using a differential interferometer, after subtracting the contribution of the known step height along with the phase difference between the transparent material at this location and the transparent material at the starting measurement location. The measured height profile can again be corrected using this measured phase difference.

In accordance with another embodiment of the present invention, a dishing value may be obtained without generating the actual height profile for the entire scan. This embodiment is similar to the embodiment described in reference to FIG. 16, however steps 172 and 178 are omitted. The relationship between thickness and phase for the transparent material is not generated and the phase measurements of the transparent regions are not converted to thickness. The location of the first measurement spot of the differential interferometer scan coincides with the location of the material specific phase and thickness measurement. It is assumed that this point represents the maximum thickness of the transparent region, which is a reasonable assumption because this point occurs in an area that is supposed to be flat and is, therefore, close to the highest point of the transparent area. The abbreviated procedure corrects the regions of the phase profile when the measurement spot hits the opaque material 164 (step 176) using the material specific phase difference from steps 171, 173 and 174. Then it converts the phase profile to a height profile for these opaque material 164 regions (step 177). This yields a height profile that displays the accurate relationship of the opaque regions with respect to the first measurement point of the scan. It does not accurately portray the thickness profile in the transparent regions, the erosion areas adjacent to the opaque feature. After converting the phase profile to a height profile, dishing can be calculated (step 179). This particular definition of dishing is the difference in height between a defined low area of a portion or all of an opaque material 164 region and the height of the transparent material 162 at the first measurement spot location.

Moreover, a dishing value may be obtained by generating the actual height profile for only a portion of the opaque material 164 from FIG. 15. For example, when the measurement spot hits the opaque material 164 (step 176), the material specific phase difference from steps 171, 173 and 174 may be used to correct the phase profile for only the lowest portion of the opaque material 164. The phase profile for the lowest portion of the opaque material is then converted to a height profile (step 177). This yields a height profile that displays the accurate relationship of only the lowest portion of the opaque region with respect to the first measurement point of the scan or any chosen portion of the transparent material 162. In one embodiment, for example, it may be desirable to locate a fraction of the lowest measurement points, 1% to 50%, e.g., 20%, of an opaque material 164 region and use the average of these values to represent the lowest value of this region. For example, intensity information could be used to locate the center 20% of the opaque region that is then chosen as the lowest portion of the opaque region. A simple dishing value can then be calculated by subtracting the chosen low point or average of points in the opaque material 164 from the height associated with the first point of the scan or any chosen point or average of points in transparent material 162. In addition, it should be noted that there are a number of ways to determine the amount of dishing. For example, the height of the transparent feature may be defined far from the opaque feature where erosion is minimal or near the opaque feature where there is significant erosion. Another option is to average the height of the two transparent features surrounding the opaque feature to yield an average transparent region height.

Figure 17:
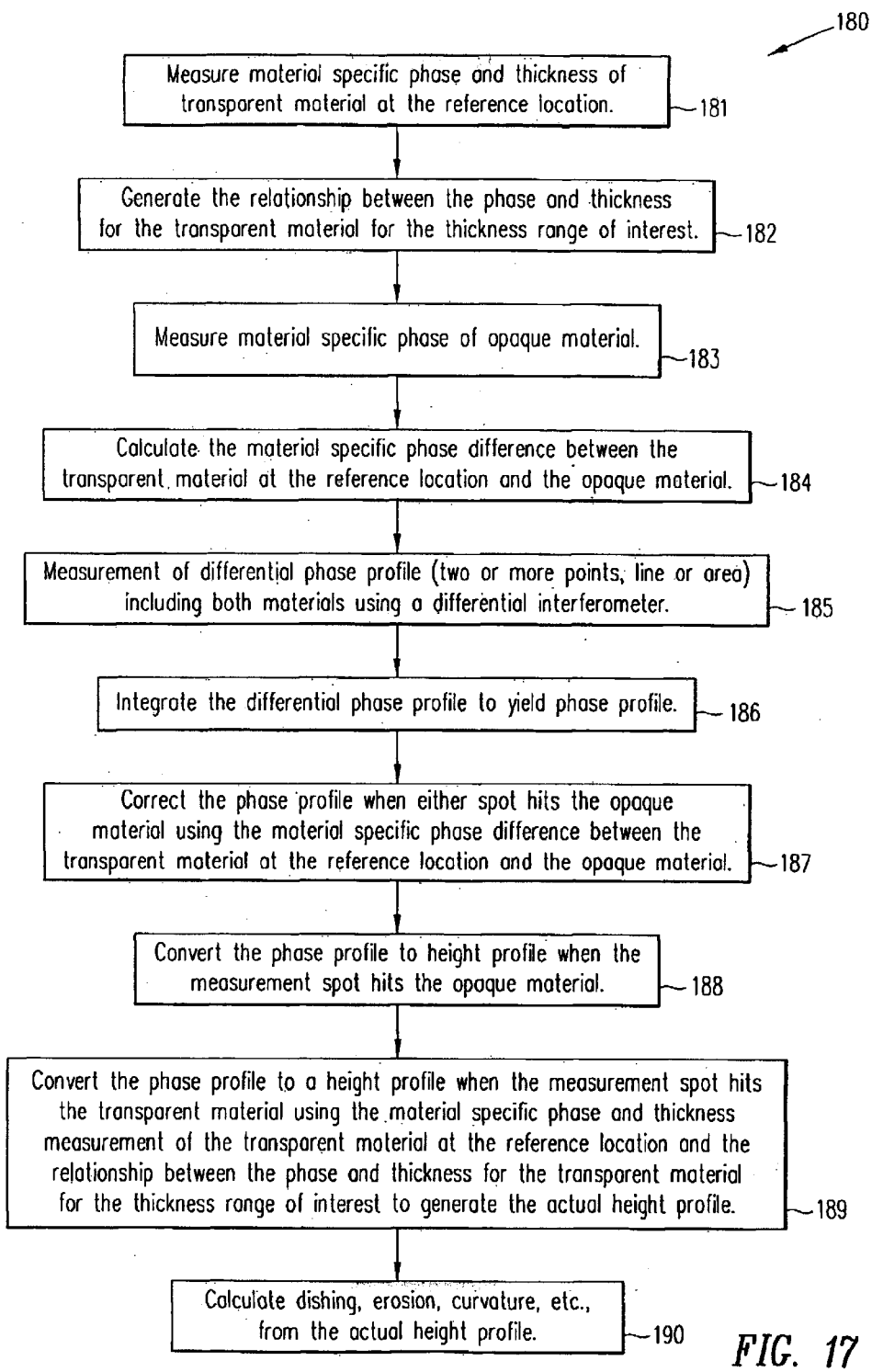
FIG. 17 is a flow chart describing the process of generating the actual height profile of a sample composed of an opaque material and a transparent material using a differential scan.

FIG. 17 shows a flow chart 180 for generating the actual height profile of a differential scan of sample 160 with the measurement spot intercepting at least one point in transparent material 162 and opaque material 164 in FIG. 15. It is very similar to the method used with a reference scan described in FIG. 16. In step 181, a material specific phase and thickness measurement is made of transparent-material 162 preferably at the starting location of the measurement spot. A thickness measurement of transparent material 162 at this location, if performed, will provide the absolute height of the actual height profile. Preferably, the measurement is started at a location in transparent material 162 that is at a constant height so that both spots are at the same phase value.

The relationship between the thickness and phase of the transparent material 162 is generated for the thickness range of interest (step 182).

In step 183, a material specific phase measurement is made of opaque material 164. The phase measurements may be made using, e.g., an ellipsometer, and will provide a material specific phase for the material at one or more frequencies used by the differential interferometer. Alternatively, the phase measurements may be obtained from a reference source, e.g., a library of phase measurements of different materials.

The material specific phase difference between the transparent material 162 and the opaque material 164, is calculated (step 184). The sign of this phase difference will change when the measurement and reference spots swap the intercepted materials.

A measurement is then made in differential mode with an optical tool, i.e., a differential interferometer that employs one or more wavelengths of light (step 185). In a typical scan, the measurement starts with both spots residing in transparent material 162, followed by the measurement spot traversing opaque material 164 while the reference spot is still in the transparent material 162, followed by both spots residing in opaque material 164, followed by the measurement spot traversing transparent material 162 while the reference spot is still in opaque material 164 and finally followed by both spots residing in transparent material 162. This scenario assumes that the spacing of the two spots is smaller than the dimension of the opaque feature.

With a differential mode scan, the phase profile must be numerically integrated to yield the phase profile that would be generated by a referential scan (step 186).

When either spot is incident on opaque material 164, the phase profile is corrected using one of two material specific phase differences (step 187).

This corrected phase profile is then converted to a height profile when the measurement spot hits the opaque material 164 (step 188).

The material specific phase and thickness of transparent material 162 from step 181 and the relationship between the thickness and phase of transparent material 162 from step 182 are used, advantageously, to convert the phase profile to a thickness profile when the measurement beam 126 is incident on transparent material 162 (step 189). The procedure is the same as described previously.

A number of measurements may be extracted from the actual height profile to generate a measurement such as dishing, erosion, curvature, curvature, or other desired measurements (step 190).

If a region can be found on the sample where there is no step height difference between the transparent material and the opaque material, a direct measurement of the material specific phase difference between the two materials can be made thereby replacing step 183. First, the phase difference between the transparent and opaque materials with no step is measured, e.g., using a differential interferometer. Next, the phase difference between the transparent material at this location and the transparent material at the starting measurement location is measured, e.g., using a differential interferometer. The material specific phase difference is calculated from these two measurements (step 184). The measured height profile can then be corrected (step 187) using this phase difference, rather than the standard calculated phase difference. Alternatively, if a region can be found on the sample with a known step height between the transparent material and the opaque material, a measurement of the phase difference between the two materials can be made, e.g., using a differential interferometer, after subtracting the contribution of the known step height along with the phase difference between the transparent material at this location and the transparent material at the starting measurement location. The measured height profile can again be corrected using this measured phase difference.

In accordance with another embodiment of the present invention, a dishing value may be obtained without generating the actual height profile for the entire scan. This embodiment is similar to the embodiment described in reference to FIG. 17, however steps 182 and 189 are omitted. The relationship between thickness and phase for the transparent material is not generated and the phase measurements of the transparent regions are not converted to thickness. The location of the first measurement spot of the DI scan coincides with the location of the material specific phase and thickness measurement. It is assumed that this point represents the maximum thickness of the transparent region, which is a reasonable assumption because this point occurs in an area that is supposed to be flat and is, therefore, close to the highest point of the transparent area. The abbreviated procedure corrects the regions of the phase profile when each spots hits a different material (step 187) using the material specific phase difference from steps 181, 183 and 184. Then it converts the phase profile to a height profile for these opaque material 164 regions (step 188). This yields a height profile that displays the accurate relationship of the opaque regions with respect to the first measurement point of the scan. It does not accurately portray the thickness profile in the transparent regions. After converting the phase profile to a height profile, dishing can be calculated (step 190). This particular definition of dishing is the difference in height between a defined low area of a fraction or all of an opaque material 164 region and the height of the transparent material 162 at the first measurement point location.

One Transparent at Two Locations

The actual thickness profile of a region containing one transparent or composite material, e.g., a dielectric material or stack, of changing thickness, e.g., region 194 shown in FIG. 19, will be described. It will be a subset of the flow chart described in FIG. 16 for a reference scan or a subset of the flow chart described in FIG. 17 for a differential scan.

For simplicity, it is assumed that substrate 166 is substantially planar below transparent material 162 so that the calculated changes in thickness will be assumed to be entirely due to transparent material 162. The reference mode measurement of an actual thickness profile of a region is similar to that described in flow chart 170 in FIG. 16, where the material specific phase and thickness of transparent material 162 is measured at the starting measurement spot location (step 171). As discussed above, the thickness measurement may be necessary if the transparent material has the same material specific phase value at two or three thicknesses. The relationship between the thickness and phase of the transparent material 162 is generated for the thickness range of interest (step 172). A reference mode measurement is made of the transparent material 162 over region 194 in FIG. 19 to generate the phase profile (step 175). Because there is no opaque material in this embodiment, steps 173, 174, 176 and 177 are skipped. The material specific phase and thickness of transparent material 162 from step 171 and the relationship between the thickness and phase of transparent material 162 from step 172 are used, advantageously, to correct the thickness profile when both the reference beam 124 and the measurement beam 126 are incident on transparent material 162 (step 178). For example, one use of this actual transparent material thickness profile is to measure erosion of the transparent material that is near an opaque material structure (step 179).

The differential mode measurement of an actual thickness profile of a region is similar to that described in flow chart 180 in FIG. 17, where the material specific phase and thickness of transparent material 162 is measured at the starting measurement spot location (step 181). The relationship between the thickness and phase of the transparent material 162 is generated for the thickness range of interest (step 182). A differential mode measurement is made of the transparent material 162 over region 188 in FIG. 19 to generate the phase profile (step 185). The phase profile is numerically integrated to yield the same phase profile that would be generated with a referential scan (step 186). Because there is no opaque material in this embodiment, steps 183, 184, 187 and 188 are skipped. The material specific phase and thickness of transparent material 162 from step 181 and the relationship between the thickness and phase of transparent material 162 from step 182 are used, advantageously, to correct the thickness profile when both the reference beam 124 and the measurement beam 126 are incident on transparent material 162 (step 189). This actual thickness profile is used to measure erosion of the transparent material that is near the opaque material (step 190).

Two Different Transparent Materials

The following discussions are equally applicable for samples that contain two transparent materials, one transparent and one composite material or two composite materials. The only significant differences are the models used to generate the relationship between thickness and phase for a composite material compared to a transparent material. The shape of the thickness versus phase curve for a composite material will be similar to the curve for a transparent material as shown in FIG. 18. The case of one transparent and one composite material is of interest because of the erosion problem associated with a copper CMP process. In the following example, the first transparent material is composed of a dielectric stack and the second transparent material is a composite material composed of a dielectric stack and embedded opaque metal lines. The pitch associated with the metal lines is smaller than the spot size associated with the differential interferometer. The presence of the metal lines enhances the composite material CMP rate, thus creating erosion.

Figure 20:
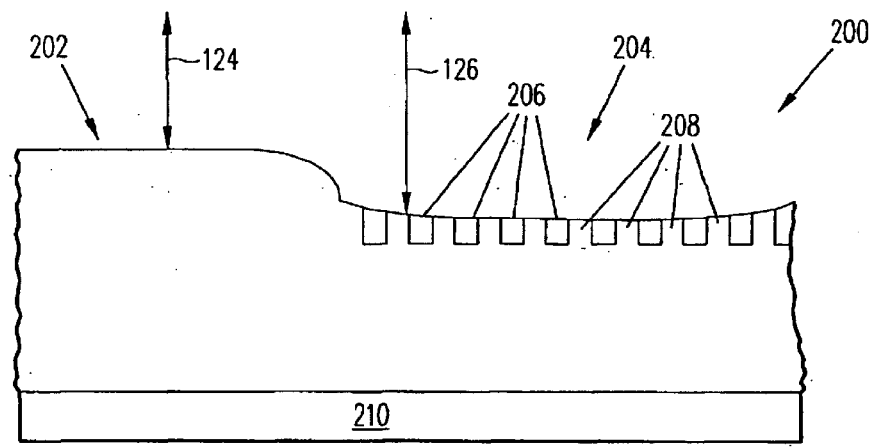
FIG. 20 shows a cut-away view of the thickness profile associated with a composite feature including both opaque and transparent material and that is surrounded by transparent material.
Figure 21:
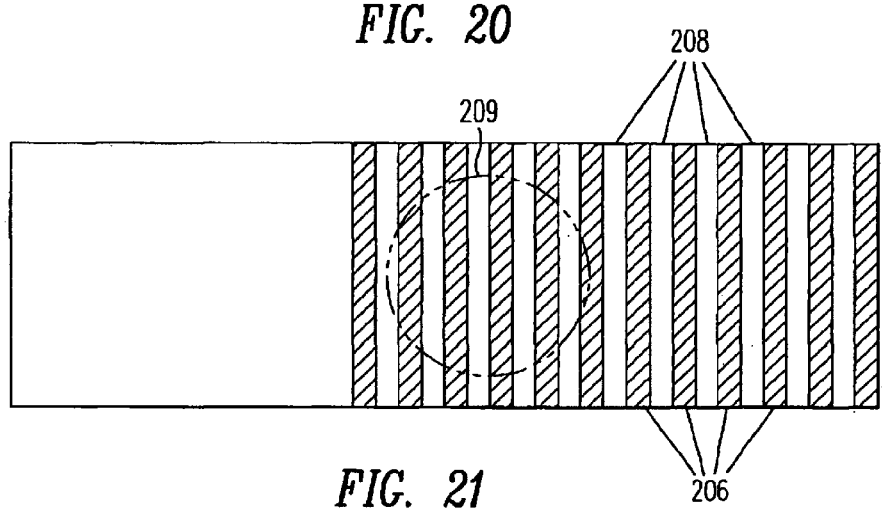
FIG. 21 shows the top view of the composite feature of FIG. 17 intercepted by the measurement spot.

FIG. 20 illustrates two beams orthogonal to the sample surface originating from an optical tool, e.g., a differential interferometer, measuring the thickness profile of transparent material 202 and composite material 204 on a portion of a sample 200. Both the transparent material 202 and the composite material 204 are assumed to reside on opaque or extremely thick substrate 210. The reference beam 124 is shown incident on the transparent material 202, which may be a dielectric layer or stack, e.g., an oxide/nitride/oxide stack, while the measurement beam 126 is shown incident on the composite material 204. For example, as shown in FIG. 20, composite material 204 may include densely packed opaque lines 206 of copper or other metal/metal alloy and transparent material 208, which may be the same as transparent material 202. Thus, the actual thickness profile may be used to measure erosion of a region with a specified metal density and pitch on an area of a semiconductor sample. FIG. 21 shows a measurement spot 209 incident on composite material 204. As shown in FIG. 21, opaque lines 206 have a small width and thus spot 209 overlaps several lines. Consequently, composite material 204 is partially transparent and partially opaque. For simplicity, it is assumed that substrate 210 is substantially planar below transparent material 202 and composite material 204 so that the calculated changes in thickness will be assumed to be entirely due to transparent material 202 and composite material 204 and not substrate 210.

Again, while FIG. 20 shows the differential interferometer operating in differential mode if the scan direction is parallel to the paper surface, it should be understood that the differential interferometer may operate in reference mode. The starting measurement location must be in an area of constant thickness for a differential mode measurement or both reference points, the reference line or the reference area must be at the same thickness for a referential mode measurement.

Figure 22A:
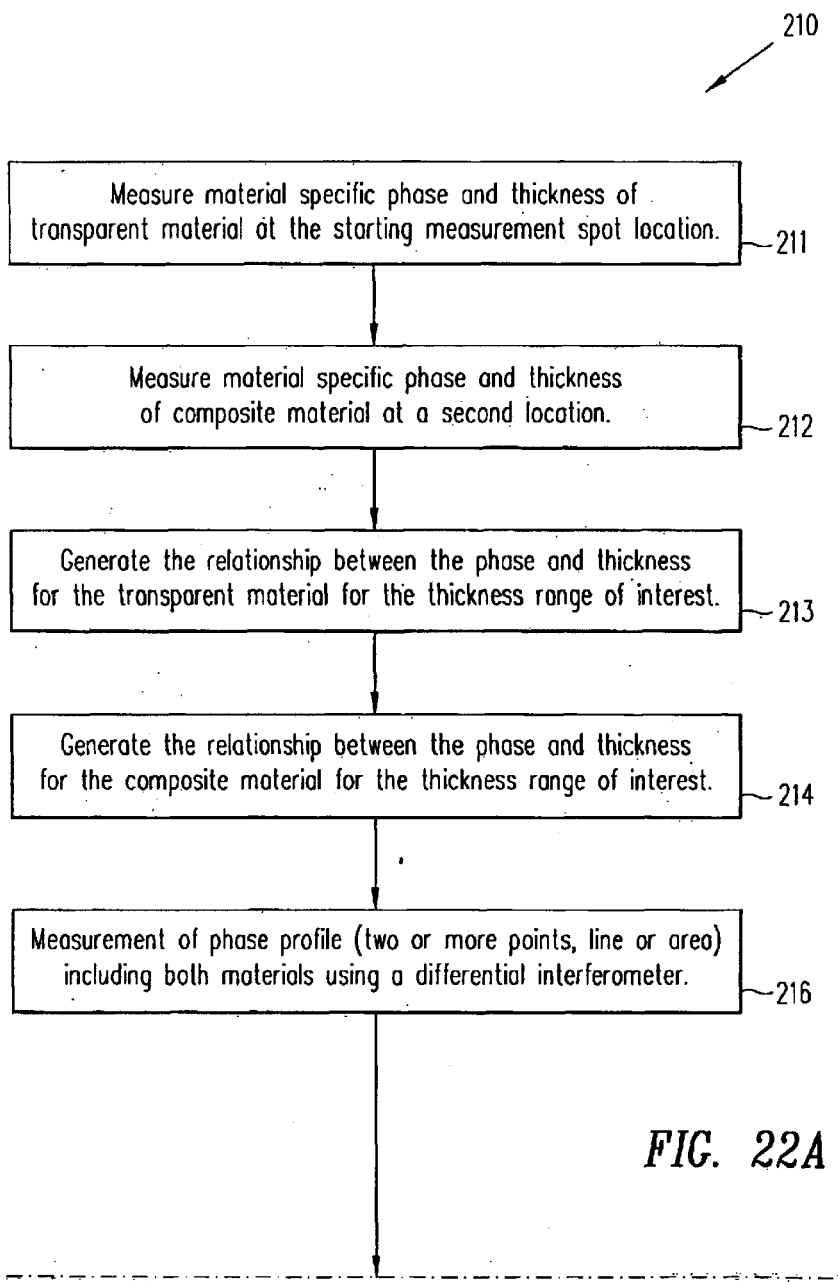
FIGS. 22A and 22B are a flow chart describing the process of generating the actual thickness profile of a sample composed of a transparent material and a composite material using a referential scan and two material specific phase measurements.
Figure 22B:
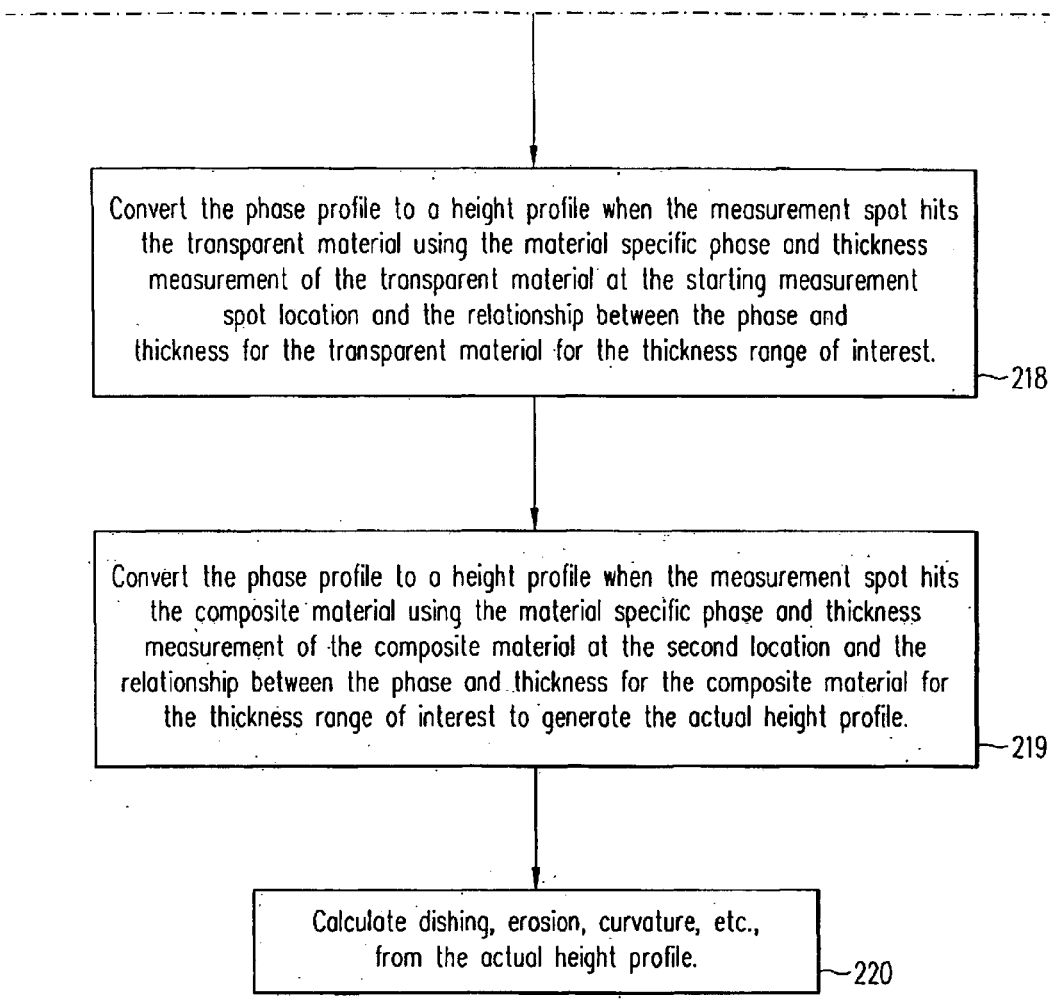

FIGS. 22A and 22B show a flow chart 210 for generating the actual thickness profile of a reference scan of sample 200 with the measurement spot intercepting at least one point in transparent material 202 and one point in composite material 204 and the reference spot staying in transparent material 202 in FIG. 20. It also assumes that a phase and thickness measurement will be made for each material. In step 211, a material specific phase and thickness measurement is made of transparent material 202 preferably at the starting measurement spot location. The thickness measurement of transparent material 202 at this location will provide the absolute thickness of the actual thickness profile and may be necessary if material 202 has two or three thickness values for a particular phase value. All reference points, a reference line or a reference area must be at the same thickness for a precise referential mode measurement.

In step 212, a material specific phase and thickness measurement is made of composite material 204 at a second location that must coincide with a measurement point of the differential interferometer.

The relationship between the thickness and phase of the transparent material 202 is generated for the thickness range of interest (step 213) as well as the relationship between the thickness and phase of the composite material 204 (step 214).

The procedure can optionally be stopped at this step if only a difference in thickness between these two measurement locations and not an actual thickness profile is desired. This difference in phase can be converted to a difference in thickness or the difference in thicknesses can be directly calculated to yield the difference in thickness between the two measurement locations. No differential interferometer measurement is required if only a difference in thickness is required.

A measurement is then made in reference mode with an optical tool, e.g., a differential interferometer that employs one or more wavelengths of light (step 216). In a typical scan, the measurement starts with both spots residing in transparent material 202, followed by the measurement spot traversing composite material 204 followed by both spots residing in transparent material 202. In the reference mode, the reference spot is preferably incident on two or more points, a line or an area of transparent material 202 that remains at a constant thickness and does not travel over opaque material 204.

The material specific phase and thickness of transparent material 202 from step 211 and the relationship between the thickness and phase of transparent material 202 from step 213 are used, advantageously, to convert the phase profile to a thickness profile when both the reference beam 124 and the measurement beam 126 are incident on transparent material 202 (step 218).

The material specific phase and thickness of composite material 204 from step 212 and the relationship between the thickness and phase of composite material 204 from step 214 are used, advantageously, to convert the phase profile to a thickness profile when the measurement beam 126 is incident on composite material 204 (step 219).

A number of measurements may be extracted from the actual thickness profile to generate a measurement such as erosion, curvature, or other desired measurements (step 220).

If an accurate measurement of the erosion of transparent material 202 near the location of a feature composed of composite material 204 is not desired, it is not necessary to generate the relationship between the thickness and phase of the transparent material 202 (step 213) or correct the phase profile when both spots hit the transparent material (step 218).

Figure 23:
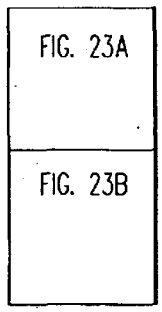
FIGS. 23A and 23B are a flow chart describing the process of generating the actual thickness profile of a sample composed of a transparent material and a composite material using a differential scan and two material specific phase measurements.
Figure 23A:
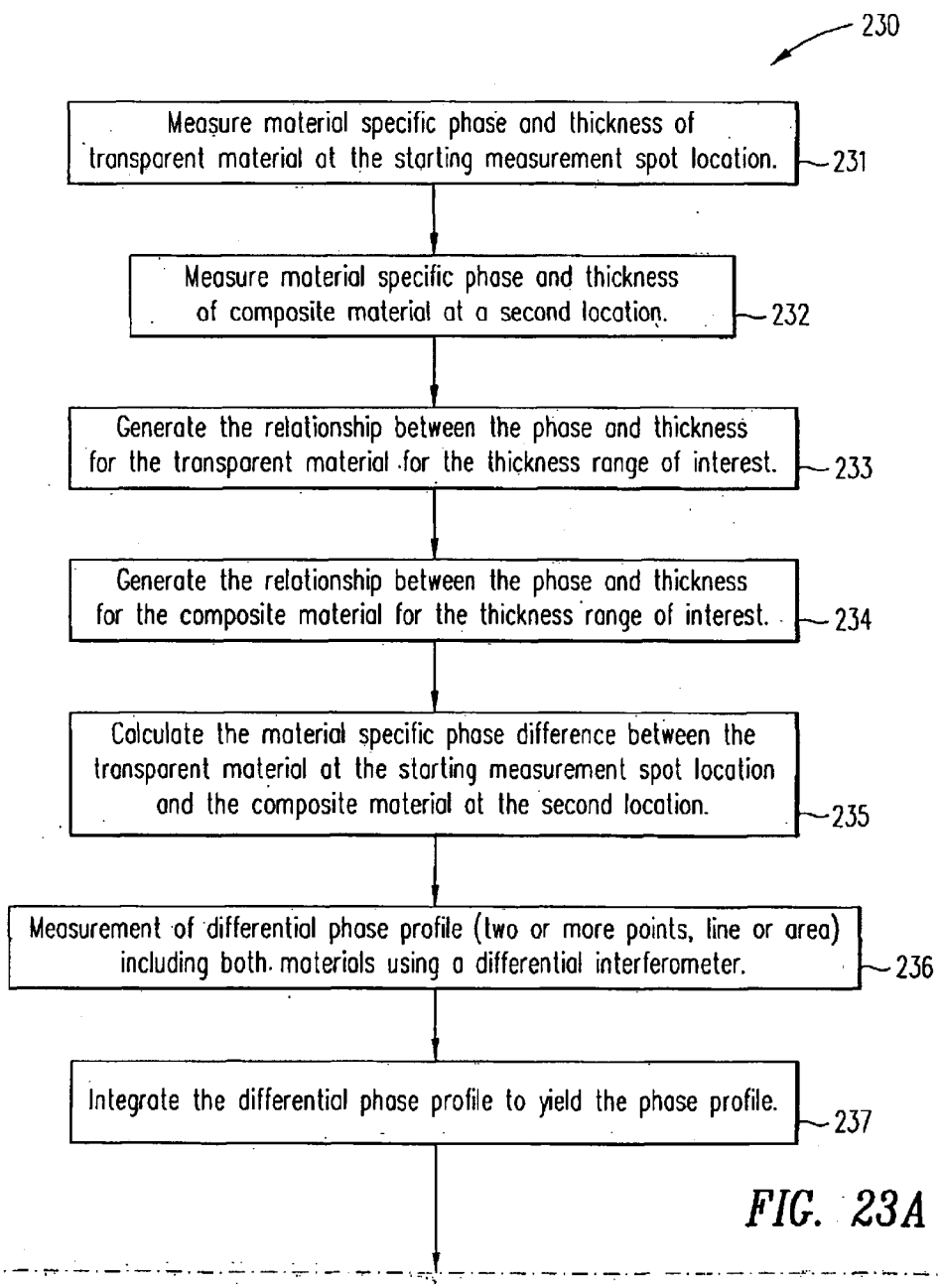
Figure 23B:
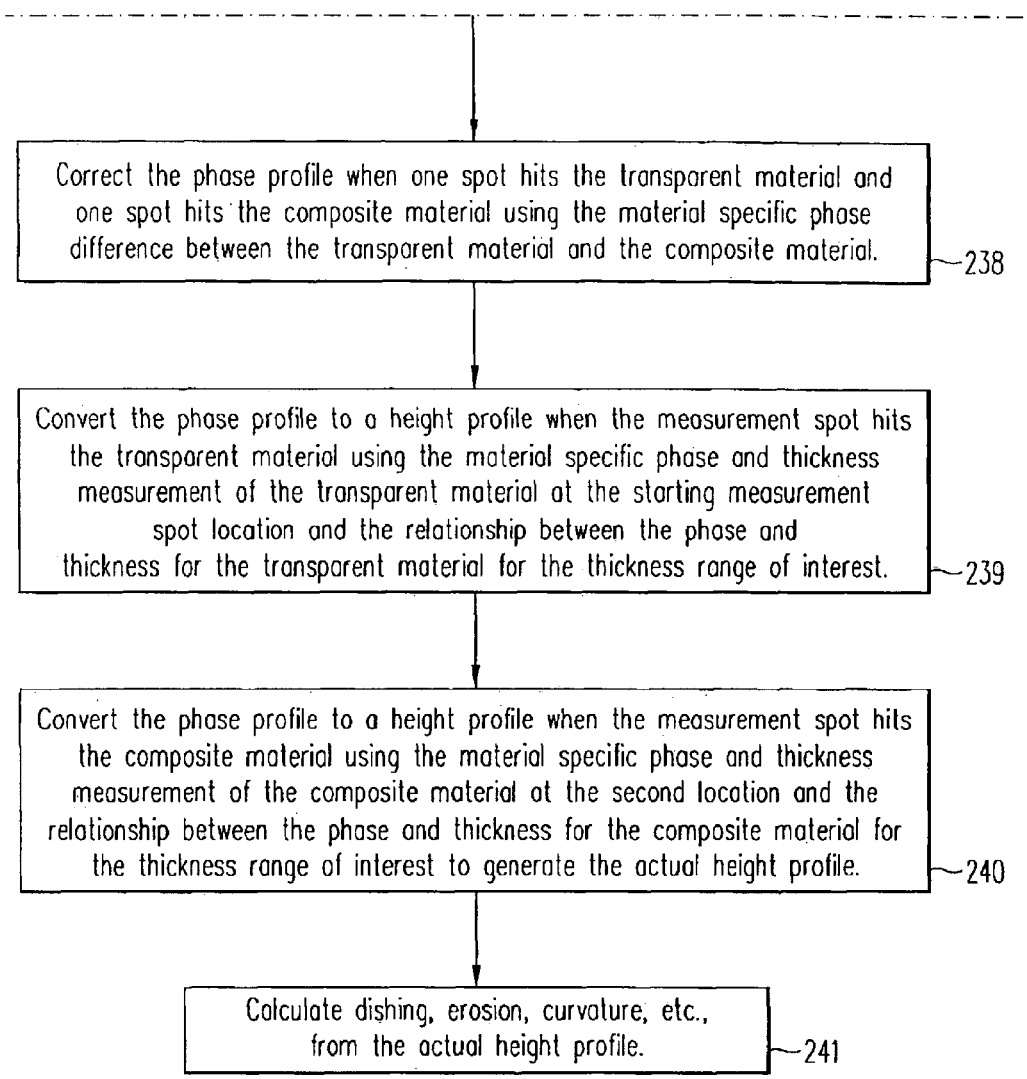

FIGS. 23A and 23B show a flow chart 230 for generating the actual thickness profile of a differential scan of sample 200 with the measurement spot intercepting at least one point in transparent material 202 and composite material 204 in FIG. 20. It also assumes that a phase and thickness measurement will be made for each material. Steps 231 and 232 may be required, for example, if the model used to generate the thickness versus phase for a composite material shows poor precision capability.

In step 231, a material specific phase and thickness measurement is made of transparent material 202 preferably at the starting measurement spot location. The thickness measurement of transparent material 202 at this location will provide the absolute thickness of the actual thickness profile and may be necessary if there are two or three thicknesses for a particular phase value. Preferably, the measurement is started at a location in transparent material 202 that is at a constant thickness so that both spots are at the same phase value.

In step 232, a material specific phase and thickness measurement is made of composite material 204 at a second location that must coincide with a measurement point of the differential interferometer. Again, the thickness value may need to be measured at the second location if the composite material has two or three thicknesses for a particular phase value.

The relationship between the thickness and phase of the transparent material 202 is generated for the thickness range of interest (step 233) as well as the relationship between the thickness and phase of the composite material 204 (step 234).

The material specific phase difference between the transparent material 202 at the measurement spot starting location and the composite material 204 at the second location is calculated (step 235). The procedure can optionally be stopped at this step if only a difference in thickness between these two measurement locations and not an actual thickness profile is desired.

A measurement is then made in differential mode with an optical tool, e.g., a differential interferometer that employs one or more wavelengths of light (step 236). In a typical scan, the measurement starts with both spots residing in transparent material 202, followed by the measurement spot traversing composite material 204 while the reference spot is still in transparent material 202, followed by both spots residing in composite material 202, followed by the measurement spot traversing transparent material 202 while the reference spot is still in composite material 204 and finally followed by both spots residing in transparent material 202. This scenario assumes that the spacing of the two spots is smaller than the dimension of the composite feature.

With a differential mode scan, the phase profile must be numerically integrated to yield the phase profile that would be generated by a referential scan (step 237).

When one spot is incident on transparent material 202 and one spot is incident on composite material 204, the phase profile is corrected using one of two material specific phase differences (step 238).

The material specific phase and thickness of transparent material 202 from step 231 and the relationship between the thickness and phase of transparent material 202 from step 233 are used, advantageously, to convert the phase profile to a thickness profile when the measurement beam 126 is incident on transparent material 202 (step 239).

The material specific phase and thickness of transparent material 204 from step 232 and the relationship between the thickness and phase of composite material 204 from step 234 are used, advantageously, to convert the phase profile to a thickness profile when the measurement beam 126 is incident on composite material 204 (step 240).

A number of measurements maybe extracted from the actual thickness profile to generate a measurement such as erosion, curvature, or other desired measurements (step 241).

If an accurate measurement of the erosion of transparent material 202 near the location of a feature composed of composite material 204 is not desired, it is not necessary to generate the relationship between the thickness and phase of the transparent material 202 (step 233) or correct the thickness profile when both spots hit the transparent material (step 239).

Although the present invention is illustrated in connection with specific embodiments for instructional purposes, the present invention is not limited thereto. Various adaptations, modifications, and combinations may be made without departing from the scope of the invention. Moreover, it should be understood that a metrology process may be used with wafers, flat panel displays or any other device in which the measurement of the thickness profile, including dishing, erosion and/or curvature is desirable. Further, it should be understood that the data may be stored in a computer readable medium and manipulated mathematically using, e.g., an appropriate processor or microprocessor reading software, which may be written by one of ordinary skill in the art in light of the present disclosure. As discussed, only fraction of the data need be converted to an actual height profile to produce a meaningful measurement of dishing or erosion. Therefore, the spirit and scope of the appended claims should not be limited to the foregoing description.

What is claimed is:

1. A method of determining the material intercepted by a spot of light during the measurement of a region including at least a first material and a second material, said method comprising:

scanning a measurement spot of light from a differential interferometer across said region;

measuring the intensity of at least said measurement spot of light scanning across said region; and determining the material that at least said measurement spot of light is incident upon by the measured intensity.

2. The method of claim 1, further comprising:

modulating the phase of radiation produced by a laser;

splitting said radiation produced by said laser into two beams;

reflecting said two beams of said sample;

recombining said two beams into a single beam; and detecting said single beam.

3. The method of claim 2, wherein detecting said single beam produces a detector signal, said method further comprising:

analyzing the intensity of said detector signal using $$\text{Intensity}=A+B \times Cos(CV+D)$$

where A is the average intensity of the detector signal, B is one half of the peak to peak intensity, C is the modulator sensitivity, V is the applied modulator voltage and D is the phase shift associated with the two beams.

4. The method of claim 3, further comprising:

determining a first intensity of one of said two beams and a second intensity of the other of said two beams using A and B and using the following formulas:

$$\text{First Intensity} = \frac{A + \sqrt{A^2 - B^2}}{2}$$

$$\text{Second Intensity} = \frac{A - \sqrt{A^2 - B^2}}{2};$$

and determining the material that said two beams are incident upon using at least one of said first intensity and said second intensity.

* * * * *